(12) United States Patent
Kazuno et al.

(10) Patent No.: US 9,299,996 B2
(45) Date of Patent: Mar. 29, 2016

(54) FUEL CELL SYSTEM

(71) Applicant: HONDA MOTOR CO., LTD., Tokyo (JP)

(72) Inventors: Shuichi Kazuno, Wako (JP); Hibiki Saeki, Wako (JP); Takuya Shirasaka, Wako (JP); Kazunori Watanabe, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 156 days.

(21) Appl. No.: 13/798,111

(22) Filed: Mar. 13, 2013

(65) Prior Publication Data

US 2013/0288148 A1 Oct. 31, 2013

(30) Foreign Application Priority Data

Apr. 27, 2012 (JP) ................. 2012-102027

(51) Int. Cl.
*H01M 8/04* (2006.01)
*B60L 11/18* (2006.01)
*H01M 8/06* (2006.01)

(52) U.S. Cl.
CPC ....... *H01M 8/04089* (2013.01); *B60L 11/1883* (2013.01); *B60L 11/1887* (2013.01); *H01M 8/0488* (2013.01); *H01M 8/04619* (2013.01); *H01M 8/04753* (2013.01); *B60L 2210/14* (2013.01); *H01M 8/0435* (2013.01); *H01M 8/04097* (2013.01); *H01M 8/04395* (2013.01); *H01M 8/04604* (2013.01); *H01M 8/04992* (2013.01); *H01M 8/0662* (2013.01); *H01M 2250/20* (2013.01); *Y02E 60/50* (2013.01); *Y02T 10/7225* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 2004/0131902 A1* | 7/2004 | Frank et al. | 429/21 |
| 2008/0220300 A1* | 9/2008 | Jones et al. | 429/23 |
| 2009/0029197 A1* | 1/2009 | Hibino et al. | 429/13 |
| 2010/0055522 A1* | 3/2010 | Manabe et al. | 429/23 |

FOREIGN PATENT DOCUMENTS

| | | |
|---|---|---|
| JP | 10-284102 | 10/1998 |
| JP | 2007-005038 | 1/2007 |
| JP | 2007-184196 | 7/2007 |
| JP | 2008-226591 | 9/2008 |
| JP | 2009-32418 | 2/2009 |
| JP | 2010-257928 | 11/2010 |

OTHER PUBLICATIONS

Inoue (JP 10-284102 A, Machine translation).*
Japanese Office Action for corresponding JP Application No. 2012-102027, Dec. 9, 2013.

* cited by examiner

*Primary Examiner* — Carlos Barcena
*Assistant Examiner* — Wojciech Haske
(74) *Attorney, Agent, or Firm* — Mori & Ward, LLP

(57) ABSTRACT

A fuel cell system includes a fuel cell, a reactant gas supply device, a voltage adjusting device, a load, and a control device. The control device executes a fixed voltage/variable output control where, in a state where an output voltage of the fuel cell is fixed to a voltage value outside of a redox advancing voltage range using the voltage adjusting device, a supply amount of reactant gas supplied from the reactant gas supply device to the fuel cell is changed so as to track a request output of the load. The control device restricts a change rate of the supply amount of the reactant gas supplied from the reactant gas supply device to the fuel cell if there is change in the request output of the load while the fixed voltage/variable output control is being executed.

7 Claims, 25 Drawing Sheets

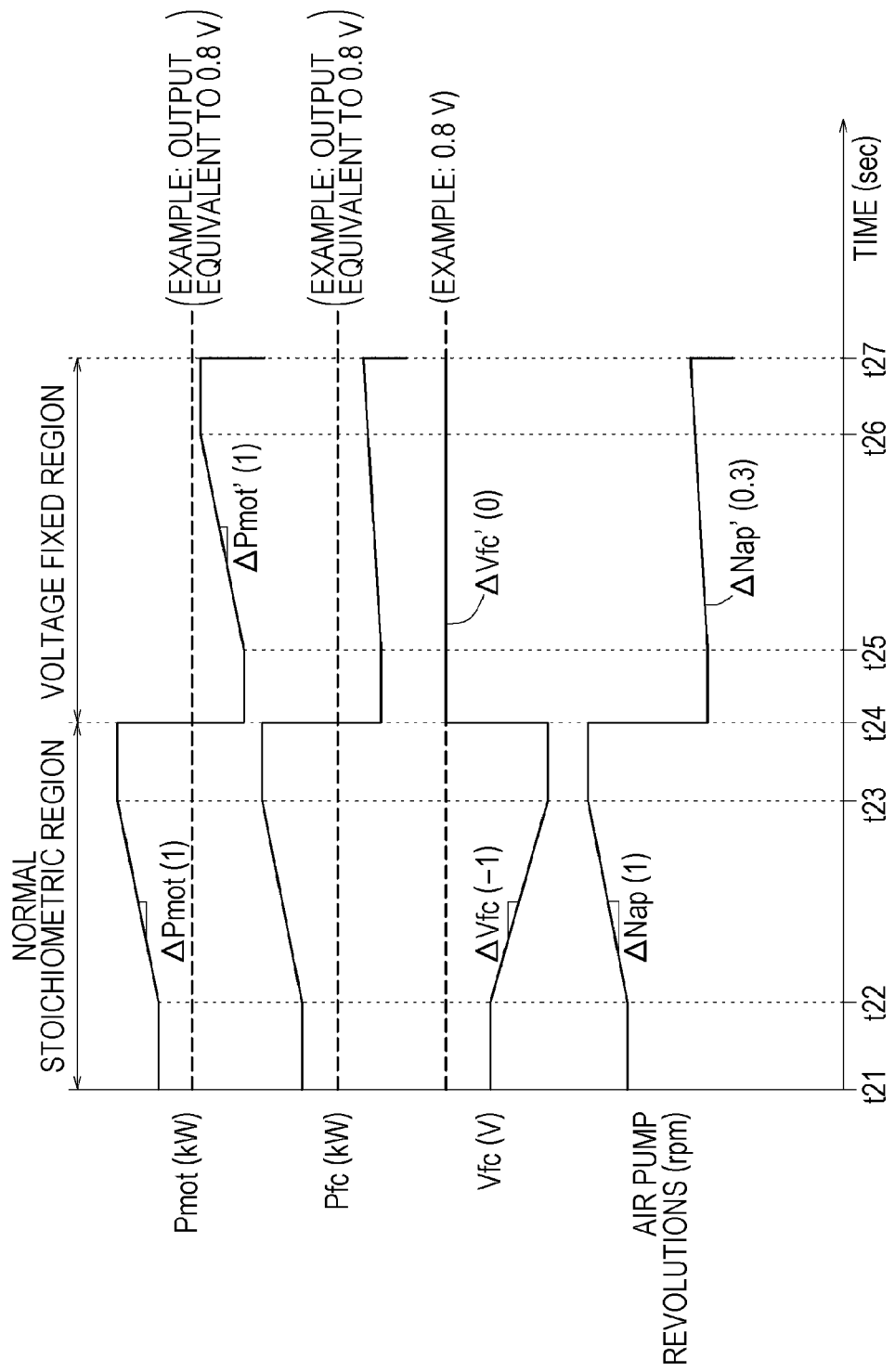

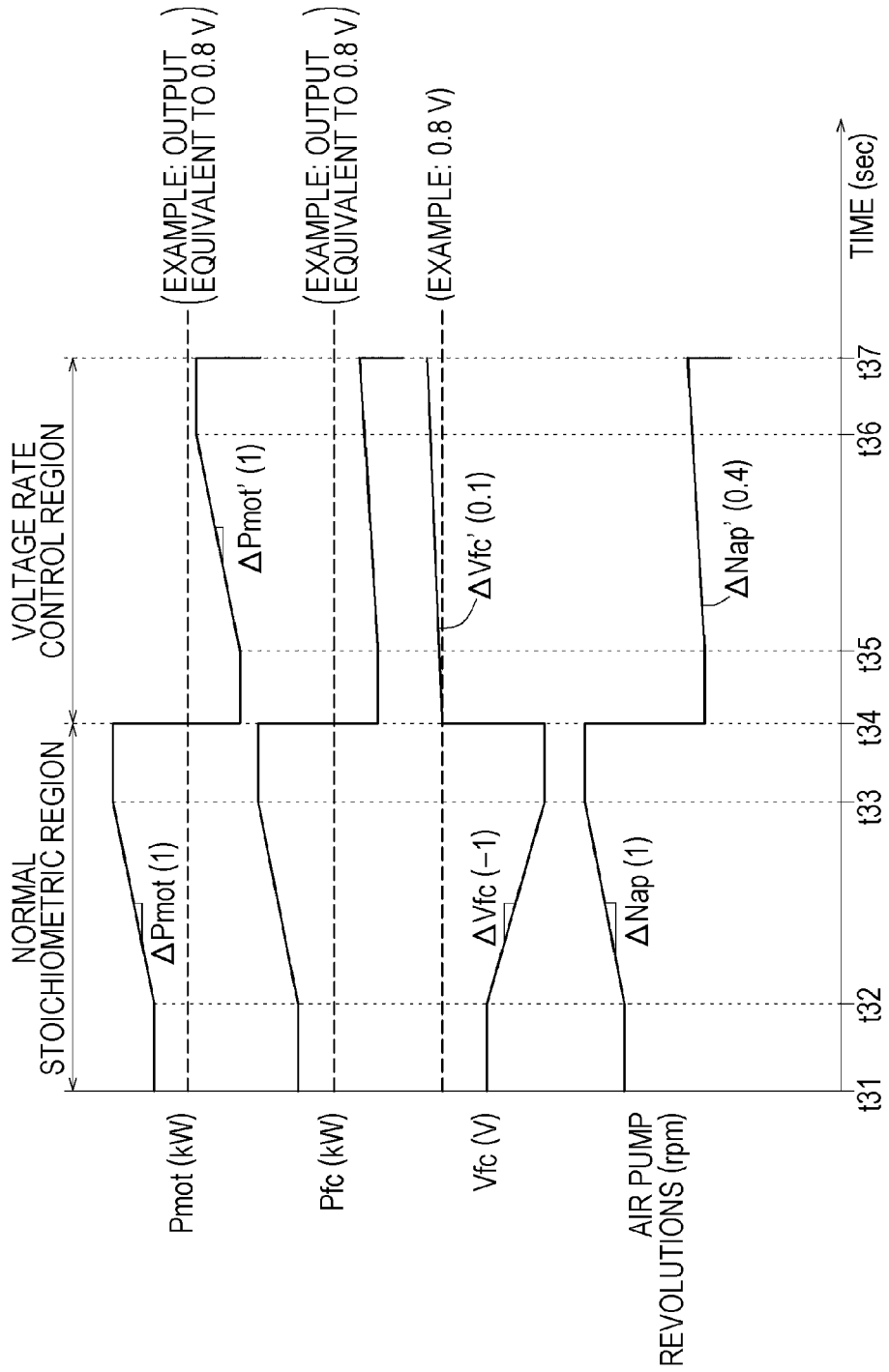

FUEL CELL SYSTEM

CROSS-REFERENCE TO RELATED APPLICATIONS

The present application claims priority under 35 U.S.C. §119 to Japanese Patent Application No. 2012-102027, filed Apr. 27, 2012, entitled "Fuel Cell System." The contents of this application are incorporated herein by reference in their entirety.

BACKGROUND OF THE INVENTION

1. Field of the Invention

The present disclosure relates to a fuel cell system.

2. Discussion of the Background

There has been proposed an arrangement where, in the event that with a fuel cell system, detection is made that output demand for a load which is driven under supply of electric power from a fuel cell has changed from a high value to a low value, rate limitation control is executed in which the voltage change rate which is time change of inter-electrode voltage of a cell making up the fuel cell is restricted to within 200 mV/s, thereby suppressing deterioration of the fuel cell, and improving durability and reliability of the fuel cell (see Japanese Unexamined Patent Application Publication 2009-32418).

SUMMARY OF THE INVENTION

According to one aspect of the present invention, a fuel cell system includes a fuel cell, a reactant gas supply device, a voltage adjusting device, a load, and a control device. The fuel cell has a catalyst and is configured to generate electricity by effecting reaction of a reactant gas at the catalyst. The reactant gas supply device is to supply the reactant gas to the fuel cell. The voltage adjusting device is configured to adjust an output voltage of the fuel cell. The load is to be driven by an output of the fuel cell. The control device is configured to control the reactant gas supply device and the voltage adjusting device. The control device executes a fixed voltage/variable output control where, in a state where the output voltage of the fuel cell is fixed to a voltage value outside of a redox advancing voltage range using the voltage adjusting device, a supply amount of the reactant gas supplied from the reactant gas supply device to the fuel cell is changed so as to track a request output of the load. The control device restricts a change rate of the supply amount of the reactant gas supplied from the reactant gas supply device to the fuel cell if there is change in the request output of the load while the fixed voltage/variable output control is being executed.

According to another aspect of the present invention, a fuel cell system includes a fuel cell, a reactant gas supply device, a voltage adjusting device, a load, and a control device. The fuel cell has a catalyst and is configured to generate electricity by effecting reaction of a reactant gas at the catalyst. The reactant gas supply device is to supply the reactant gas to the fuel cell. The voltage adjusting device is configured to adjust an output voltage of the fuel cell. The load is to be driven by an output of the fuel cell. The control device is configured to control the reactant gas supply device and the voltage adjusting device. The control device is configured to perform one of a first control mode where an output voltage of the fuel cell is set to a voltage value outside of a redox advancing voltage range using the voltage adjusting device, and a second control mode where an output voltage of the fuel cell is set to one of a voltage value within the redox advancing voltage range and a voltage value outside of the redox advancing voltage range using the voltage adjusting device. In the first control mode and the second control mode, the supply amount of the reactant gas tracking an increase and a decrease in the output of the fuel cell, such that a second value is smaller than a first value when comparing the first value obtained by subtracting an absolute value of change of the supply amount of reactant gas from an absolute value of change of the output voltage in the first control mode, per unit time, with the second value obtained by subtracting an absolute value of change of the supply amount of reactant gas from an absolute value of change of the output voltage in the second control mode, per unit time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 31 is a timing chart illustrating control with another embodiment.

FIG. 32 is a timing chart illustrating control with another embodiment.

DESCRIPTION OF THE EMBODIMENTS

Figure 1:
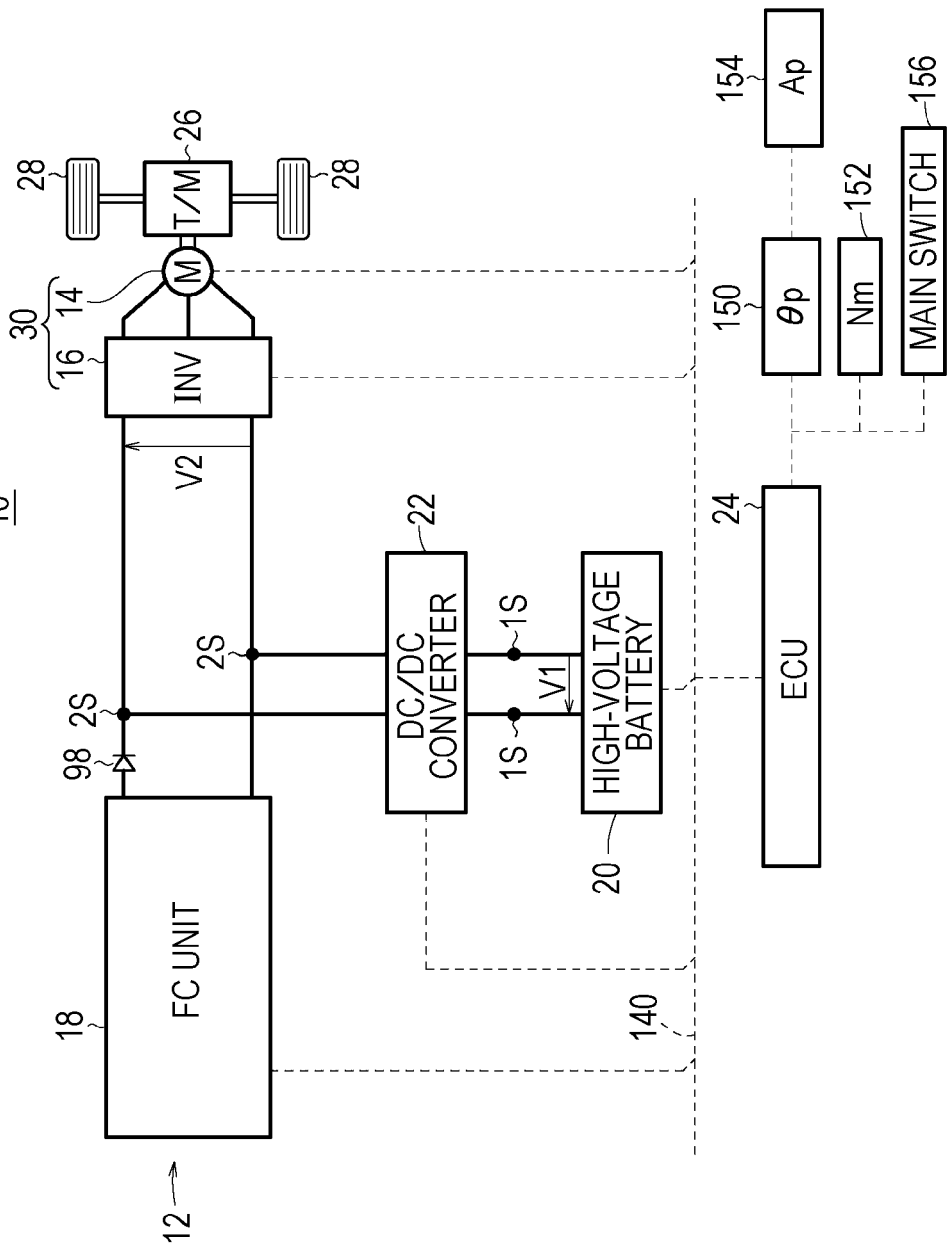
FIG. 1 is a schematic overall configuration diagram of fuel cell (FC) vehicle in which a fuel cell system according to an embodiment has been installed.

The embodiments will now be described with reference to the accompanying drawings, wherein like reference numerals designate corresponding or identical elements throughout the various drawings.

Configuration of Present Embodiment

Figure 2:
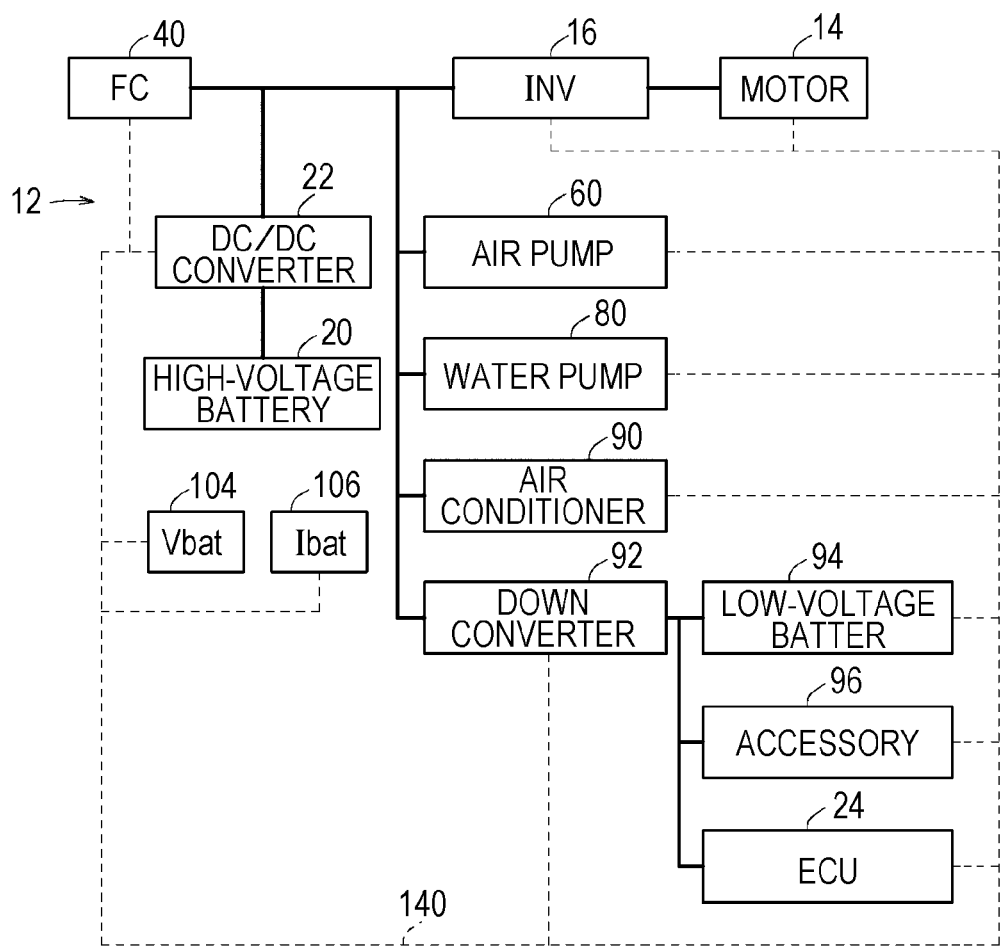
FIG. 2 is a block diagram illustrating an electric power system of the fuel cell vehicle.

FIG. 1 is a schematic overall configuration diagram of a fuel cell vehicle 10 (hereinafter also referred to as "FC vehicle 10", or simply "vehicle 10") in which is installed a fuel cell system 12 (hereinafter also referred to as "FC system 12"). FIG. 2 is a block diagram illustrating the electric power system of the FC vehicle 10. As illustrated in FIGS. 1 and 2, the FC vehicle 10 has, in addition to the FC system 12, a driving motor 14 (hereinafter also referred to as "motor 14") and an inverter 16.

The FC system 12 has a fuel cell unit 18 (hereinafter also referred to as "FC unit 18"), a high-voltage battery 20 (hereinafter also referred to as "battery 20"), a DC/DC converter 22 (voltage adjusting unit), and an electronic control unit 24 (hereinafter also referred to as "ECU 24".

The motor 14 generates driving force based on electric power supplied thereto from the FC unit 18 and the battery 20, and rotates wheels 28 via a transmission 26 by this driving force. The motor 14 also outputs electric power generated by performing regeneration (regeneration power) to the battery 20 and so forth. The unit for this regeneration power is watts (W).

The inverter 16 has a three-phase bridge configuration to perform DC/AC conversion, so as to convert DC into three-phase AC and supply to the motor 14, and also supply DC obtained by AC/DC conversion occurring at the time of regeneration operations to the battery 20 or the like via the DC/DC converter 22.

Note that the motor 14 and the inverter 16 together may be referred to as "load 30". The load 30 may also include other components, such as a later-described air pump 60, water pump 80, air conditioner 90, and so forth.

Figure 3:
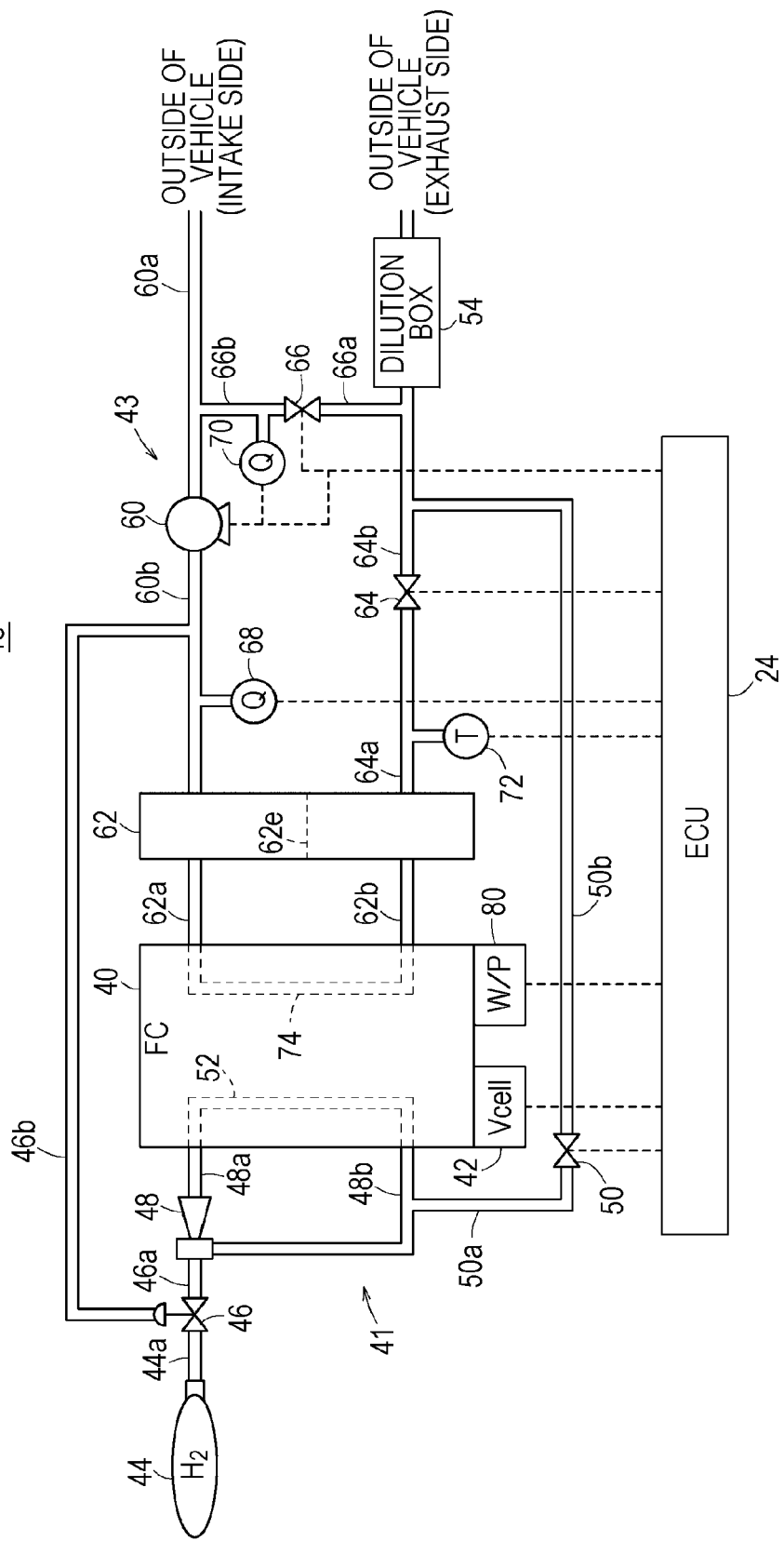
FIG. 3 is a schematic configuration diagram of a fuel cell unit according to the embodiment.

FIG. 3 is a schematic configuration diagram of the FC unit 18. The FC unit 18 has a fuel cell stack 40 (hereinafter also referred to as "FC stack 40", or simply "FC 40"), an anode system 41 (reactant gas supply device) which provides airflow of hydrogen (fuel gas, reactant gas) to the anode of the FC stack 40, a cathode system 43 (reactant gas supply device) which provides airflow of air including oxygen (oxidant gas, reactant gas), a cooling system to cool the FC stack 40, and a cell voltage monitor 42.

The FC stack 40 has a structure of a stack of fuel cells (hereinafter also referred to as "FC cell") formed by sandwiching a solid polymer electrolyte membrane between an anode electrode and a cathode electrode.

The anode system 41 has a hydrogen tank 44, a regulator 46, an ejector 48, and a purge valve 50. The hydrogen tank 44 stores hydrogen as a fuel gas, and is connected to an entrance of an anode channel 52, via piping 44a, the regulator 46, piping 46a, the ejector 48, and piping 48a. Accordingly, the hydrogen in the hydrogen tank 44 can be supplied to the anode channel 52 via the piping 44a and so forth. Note that the piping 44a is provided with an isolation valve (not illustrated), with this isolation valve being closed by the ECU 24 when the C stack 40 is generating electricity.

The regulator 46 adjusts the pressure of the introduced hydrogen to a predetermined value, and discharges it. That is to say, in accordance with the pressure of the air at the cathode side (pilot pressure) input via piping 46b, the regulator 46 controls the pressure downstream therefrom (pressure of hydrogen at the anode side). Accordingly, the pressure of hydrogen at the anode side is synchronized with the pressure of the air at the cathode side, so that when the revolutions or the like of the air pump 60 are changed to change the oxygen concentration, the pressure of the hydrogen at the anode side also changes, which will be described later.

The ejector 48 generates negative pressure by spraying hydrogen from the hydrogen tank 44 using a nozzle, and suctions anode off-gas at piping 48b by this negative pressure.

The exit of the anode channel 52 is connected to the intake of the ejector 48 via the piping 48b. The anode off-gas (hydrogen) discharged from the anode channel 52 passes through the piping 48b and is reintroduced to the ejector 48 such that the anode off-gas (hydrogen) circulates.

Note that the anode off-gas includes hydrogen unit consumed at the electrode reaction at the anode, and water vapor. Also, the piping 48b is provided with a gas-liquid separator (not illustrated) to separate and collect water (condensed water which is a liquid, and water vapor which is a gas) included in the anode off-gas.

A part of the piping 48b is connected to a dilution box 54 provided to later-described piping 64b via piping 50a, the purge valve 50, and piping 50b. In the event that determination is made that generating at the FC stack 40 is unstable, the purge valve 50 is opened a predetermined amount of time based on a command from the ECU 24. The dilution box 54 dilutes the anode off-gas from the purge valve 50 with cathode off-gas.

The cathode system 43 includes the air pump 60, a humidifier 62, a back-pressure valve 64, a circulation valve 66, flow sensors 68 and 70, and a temperature sensor 72.

The air pump 60 is for compressing external air and seeding this to the cathode side. The intake thereof communicates with the outside of the vehicle via piping 60a. The discharge of the air pump 60 is connected to the intake of a cathode channel 74 via the humidifier 62 and piping 62a. Upon operating under command of the ECU 24, the air pump 60 suctions in air outside of the vehicle via the piping 60a, compresses this external air, and feeds this compressed air to the cathode channel 74 via the piping 60b and so forth.

The humidifier 62 has multiple hollow-fiber membranes 62e having moisture permeability. The humidifier 62 uses the hollow-fiber membranes 62e to perform moisture exchange between the air heading toward the cathode channel 74 and the humid cathode off-gas exhausted from the cathode channel 74, thereby humidifying the air heading toward the cathode channel 74.

The piping 62b, humidifier 62, piping 64a, back-pressure valve 64, and piping 64b are situated at the output side of the cathode channel 74. The cathode off-gas discharged from the cathode channel 74 (oxidant off-gas) is discharged from the vehicle via the piping 62b.

The back-pressure valve 64 is configured of a butterfly valve for example, and controls the pressure of the air at the cathode channel 74 by having the opening angle thereof controlled by the ECU 24. More specifically, the smaller the opening angle of the back-pressure valve 64 is, the higher the air pressure in the cathode channel 74 becomes, and the higher the oxygen concentration per volume flow (volume concentration) becomes. On the other hand, the greater the opening angle of the back-pressure valve 64 is, the lower the air pressure in the cathode channel 74 becomes, and the lower the oxygen concentration per volume flow (volume concentration) becomes.

Piping 64b is connected to piping 60a upstream of the air pump 60 via the circulation valve 66 and piping 66b. Accordingly, part of the exhaust gas (cathode off-gas) is supplied to the piping 60a via the circulation valve 66 and piping 66b, merges with fresh air from outside of the vehicle, and is suctioned by the air pump 60.

The circulation valve 66 is configured of a butterfly valve, for example, and controls the flow of circulation gas by the opening angle thereof being controlled by the ECU 24.

The flow sensor 68 is attached to the piping 60b, detects the flow of air heading to the cathode channel 74, and outputs this to the ECU 24. The control unit 70 is attached to the piping 66b, detects the circulation gas flow Qc heading to the piping 60a, and outputs this to the ECU 24. The unit of these flows is grams per second (g/s).

The temperature sensor 72 is attached to the piping 64a, detects the temperature of the cathode off-gas and outputs this to the ECU 24. The temperature of the circulation gas is generally equal to the temperature of the cathode off-gas, so the temperature of the circulation gas can be detected based on the temperature of the cathode off-gas which the temperature sensor 72 detects.

A cooling system includes the water pump 80, and also a radiator, radiator fan, and so forth, which are not illustrated. The water pump 80 cools the FC stack 40 by circulating cooling water (coolant) through the FC stack 40. The cooling water which has been warmed by cooling the FC stack 40 has the heat thereof dissipated at the radiator which is cooled by breeze from the radiator fan.

The cell voltage monitor 42 is equipment for detecting cell voltage Vcell for each of the multiple single cells making up the FC stack 40, and has a monitor main unit and a wire harness connecting the monitor main unit with the single cells. The monitor main unit scans all of the single cells at a predetermined cycle, detects the cell voltage Vcell of each single cell, and calculates the average cell voltage and lowest cell voltage. The average cell voltage and lowest cell voltage are then output to the ECU 24.

The electric power from the FC stack 40 (hereinafter also referred to as "FC power Pfc" or "FC output Pfc") is supplied to, besides the inverter 16 and motor 14 (when driving under power) or DC/DC converter 22 and high-voltage battery 20 (when charging), the air pump 60, water pump 80, air conditioner 90, down converter 92 (step-down DC/DC converter), low-voltage battery 94, accessory 96, and the ECU 24. Note that a backflow preventing diode 98 is disposed between the FC unit 18 (FC stack 40) and the inverter 16 and DC/DC converter 22. The voltage generated by the FC stack 40 (hereinafter also referred to as "FC voltage Vfc") is detected by a voltage sensor 100 (see FIG. 4), and the current generated by the FC stack 40 (hereinafter also referred to as "FC current Ifc") is detected by a current sensor 102, with both being output to the ECU 24.

The battery 20 is a battery device (energy storage) including multiple battery cells. Examples include a lithium-ion secondary cell, nickel-hydrogen secondary cell, capacitor, and so forth. The output voltage of the battery 20 (hereinafter referred to as "battery voltage Vbat") is detected by a voltage sensor 104 (see FIG. 2), and the unit thereof is volts (V). The output current of the battery 20 (hereinafter referred to as "battery current Ibat") is detected by a current sensor 106, and the unit thereof is amperes (A). The battery voltage Vbat and battery current Ibat are each output to the ECU 24, and used to calculate the state of charge (hereinafter referred to as "SOC") of the battery, expressed in terms of percentage (%).

The DC/DC converter 22 controls the supply destination of the FC power Pfc from the FC unit 18, power supplied from the battery 20 (hereinafter referred to as "battery power Pbat"), the unit of which is watts (W), and regeneration power Preg from the motor 14.

Figure 4:
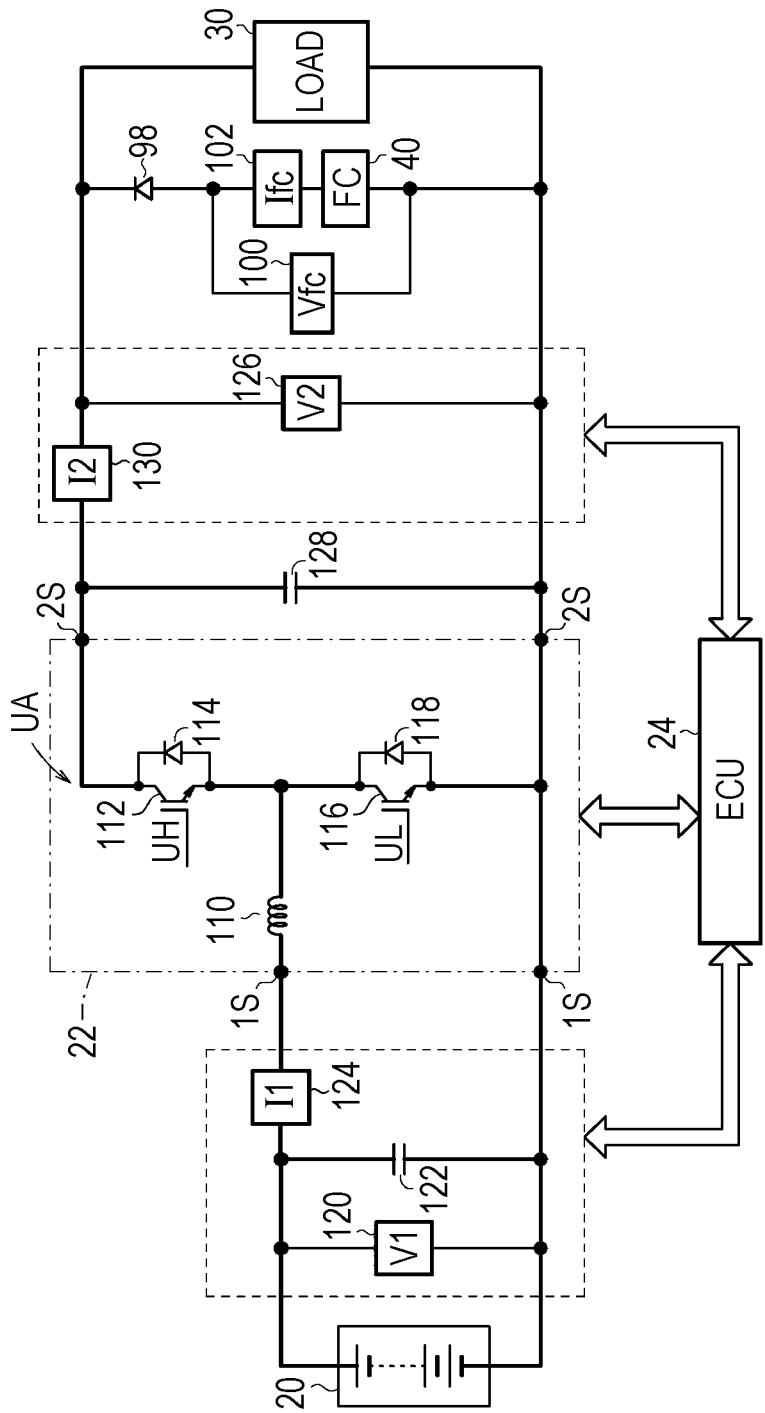
FIG. 4 is a diagram illustrating details of a DC/DC converter according to the embodiment.

FIG. 4 illustrates details of the DC/DC converter 22 according to the present embodiment. The DC/DC converter 22 has one side connected to a primary side 1S where the battery 20 is, and the other side is connected to a secondary side S2 which is a point of contact of the load 30 and FC stack 40.

The DC/DC converter 22 is type of voltage converter also known as a "chopper", which boosts the primary side 1S voltage (primary voltage V1), the unit of which is volts (V), to the secondary side 2S voltage (secondary voltage V2) the unit of which is volts (V), where V1≤V2.

As illustrated in FIG. 4, the DC/DC converter 22 is configured of a phase arm UA disposed between the primary side 1S and secondary side 2S, and a reactor 110. The phase arm UA is configured of an upper arm element (upper arm switching device 112 and antiparallel diode 114) and a lower arm element (lower arm switching device 116 and antiparallel diode 118). The upper arm switching device 112 and lower arm switching device 116 are each formed of a MOSFET, IGBT, or the like, for example.

The reactor 110 introduced between the middle point (common contact) of the phase arm US and the positive electrode, and acts to store and discharge energy at the time of the DC/DC converter 22 changing voltage between the primary voltage V1 and secondary voltage V2.

The upper arm switching device 112 is turned on by the gate driving signal (driving voltage) UH output from the ECU 24 going to high level, and the lower arm switching device 116 is turned on by the gate driving signal (driving voltage) UL going to high level.

Note that the ECU 24 detects the primary voltage V1 by a voltage sensor 120 provided in parallel with a primary side smoothing capacitor 122, and detects primary side current (primary current I1), of which the unit is amperes (A), by a current sensor 124. Also, the ECU 24 detects the secondary voltage V2 by a voltage sensor 126 provided in parallel with a secondary side smoothing capacitor 128, and detects secondary side current (secondary current I2), of which the unit is amperes (A), by a current sensor 130.

The ECU 24 controls the motor 14, inverter 16, FC unit 18, battery 20, and DC/DC converter 22, via a communication line 140 (see FIGS. 1 and 2). For this control, a program stored in memory (ROM) is executed, and the detection values of the various sensors, such as the cell voltage monitor 42, flow sensors 68 and 70, temperature sensor 72, voltage sensors 100, 104, 120, and 126, current sensors 102, 106, 124, and 130, and so forth.

The sensors include, in addition to the above-described sensors, an opening angle sensor 150 and motor RPM (revolutions per minute) sensor 152 (hereinafter refereed to as "RPM sensor 152"). The opening angle sensor 150 detects the opening angle θp of an accelerator pedal 154, in increments of degrees. The RPM sensor 152 detects the rpms of the motor 14 (hereinafter also referred to as "motor revolutions Nm" or simply "revolutions Nm"). The ECU 24 detects vehicular speed of the FC vehicle 10 in increments of kilometers per hour (km/h) using the revolutions Nm. Further, a main switch 156 (hereinafter also referred to as "main SW 156") is connected to the ECU 24. The main SE 156 is for switching whether to supply electric power from the FC unit 18 and battery 20 to the motor 14, and is user-operable.

The ECU 24 includes a microprocessor, and also has a timer, A/D converter, D/A converter, or like input/output interfaces as suitable. Note that the ECU 24 may be configured of multiple ECUs for each of the motor 14, inverter 16, FC unit 18, battery 20, and DC/DC converter 22, rather than being a single ECU alone.

The ECU 24 arbitrates and determines the allocation (burden sharing) of the load which the FC stack 40 should bear, from the loads requested of the FC system 12 as the overall of the FC vehicle 10 determined, the load which the battery 20 should bear, and the load which the regeneration power source (motor 14) should bear, based on the state of the FC stack 40 and the state of the battery 20, and also input from various switches and sensors (load request, output of request), and accordingly sends commands to the motor 14, inverter 16, FC unit 18, battery 20, and DC/DC converter 22.

Basic Control of Present Embodiment

Figure 5:
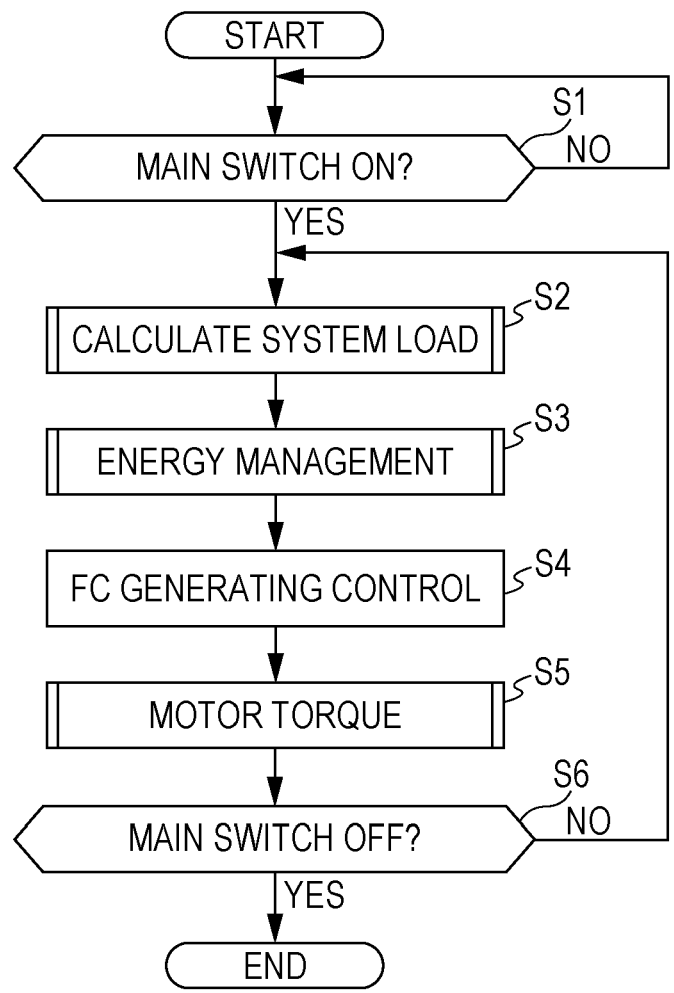
FIG. 5 is a flowchart of basic control at an electronic control unit (ECU).

Next, control at the ECU 24 will be described. FIG. 5 illustrates a flowchart of basic control with the ECU (see FIGS. 1 through 4). In step S1, the ECU 24 determines whether or not the main SW 156 is on. In the event that the main SW 156 is not on (NO in S1), step S1 is repeated. In the event that the main SW 156 is on (YES in S1), the flow advances to step S2. In step S2, the ECU 24 calculates the load to be requested of the FC system 12 (system load Psys), in increments of watts (W).

In step S3, the ECU 24 performs energy management of the FC system 12. The term "energy management" as used here is primarily processing for calculating the amount of electricity generated by the FC stack 40 (FC power Pfc) and output of the battery 20 (battery power Pbat), and the intent is to make the overall output of the FC system 12 efficient while suppressing deterioration in the FC stack 40.

In step S4, the ECU 24 performs control of the peripheral devices of the FC stack 40, which are the air pump 60, back-pressure valve 64, circulation valve 66, and water pump 80 (FC generation control).

In step S5, the ECU 24 performs torque control of the motor 14.

In step S6, the ECU 24 determines whether or not the main SW 156 is off. In the event that the main SW 156 is not off (NO in S6), the flow returns to step S2. In the event that the main SW 156 is off (YES in S6), the current processing ends.

Calculation of System Load Psys

Figure 6:
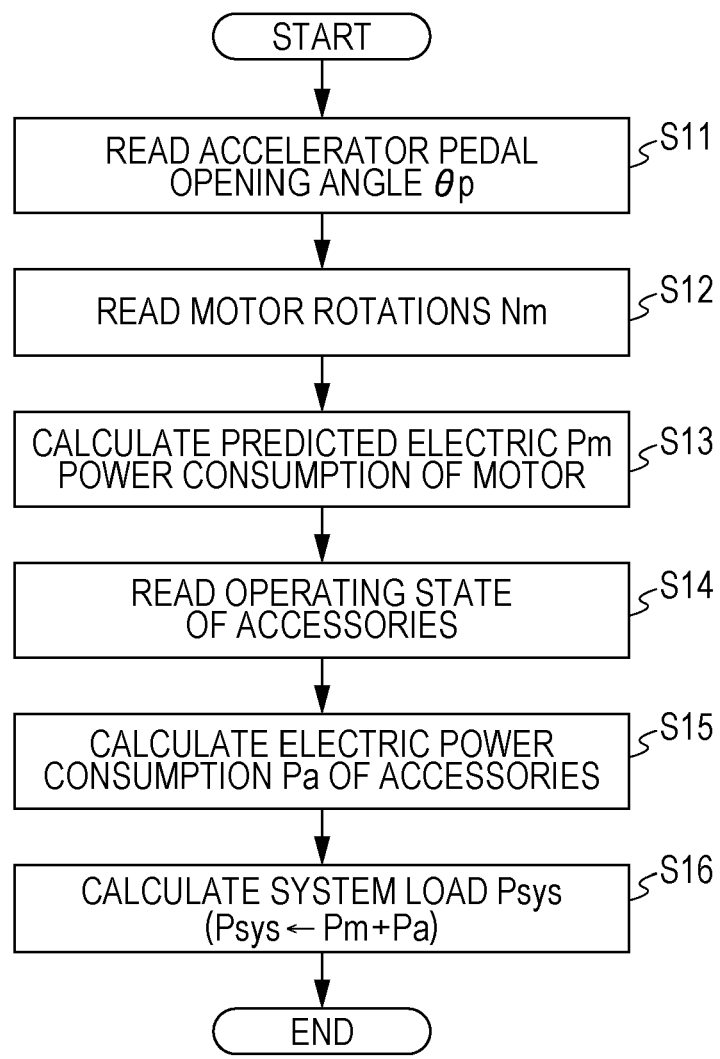
FIG. 6 is a flowchart for calculation of system load.

FIG. 6 illustrates a flowchart for calculating the system load Psys. In step S11, the ECU 24 see (FIGS. 1 through 4) reads in the opening angle θp of the accelerator pedal 154 from the opening angle sensor 150.

In step S12, the ECU 24 reads in the revolutions Nm of the motor 14 from the RPM sensor 152.

Figure 7:
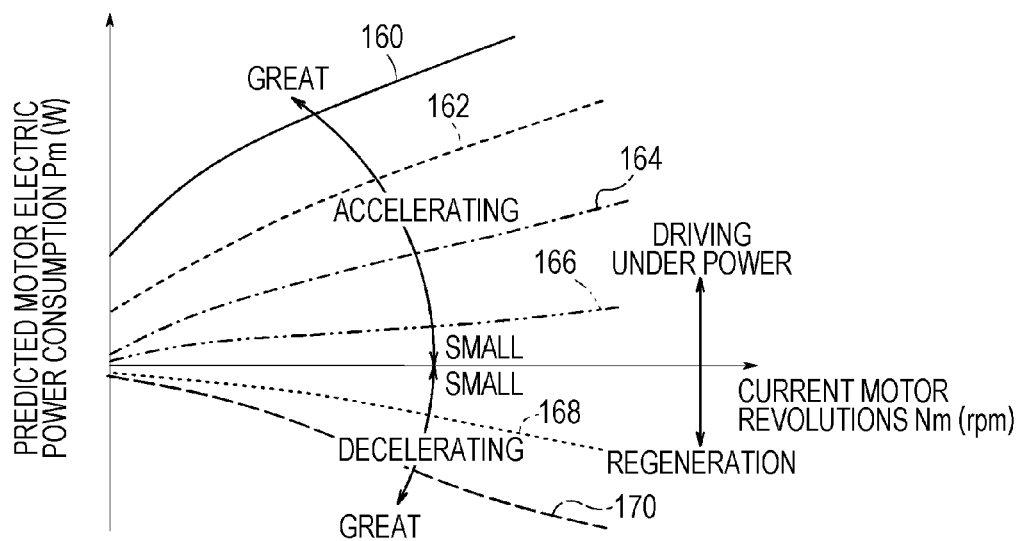
FIG. 7 is a diagram illustrating the relation between the current motor revolutions and predicted motor power consumption.

In step S13, the ECU 24 calculates the predicted electric power consumption Pm of the motor 14, based on the opening angle θp and revolutions Nm, in increments of watts (W). Specifically, in the map illustrated in FIG. 7, the relation of the revolutions Nm and predicted electric power consumption Pm is stored for each opening angle θp. For example, if the opening angle θp is θp1, a property 160 is used. In the same way, if the opening angle θp is θp2, θp3, θp4, θp5, and θp6, properties 162, 164, 166, 168, and 170, respectively, are used. Upon having identified the property indicating the relation between the revolutions Nm and predicted electric power consumption Pm based on the opening angle θp, the predicted electric power consumption Pm according to the revolutions Nm is identified.

In step S14, the ECU 24 reads the operating state from each auxiliary device. The auxiliary devices where include, for example, high-voltage auxiliary devices such as the air pump 60, water pump 80, and air conditioner 90, and low-voltage auxiliary devices such as the low-voltage battery 94, accessory 96, and ECU 24. For the air pump 60 and water pump 80, for example, the revolutions Nap and Nwp (in rpms) are read. For the air conditioner 90, the output settings are read.

In step S15, the ECU 24 calculates the power consumption Pa in watts (W) in accordance with the current operating state of each of the auxiliary devices.

In step S16, the ECU 24 calculates the sum of the predicted electric power consumption Pm of the motor 14 and the power consumption Pa of the auxiliary devices as the overall predicted electric power consumption of the FC vehicle (i.e., system load Psys).

Overview of Energy Management

As described above, the energy management according to the present embodiment (step S3 in FIG. 5) intends to make the overall output of the FC system 12 efficient while suppressing deterioration in the FC stack 40.

Figure 8:
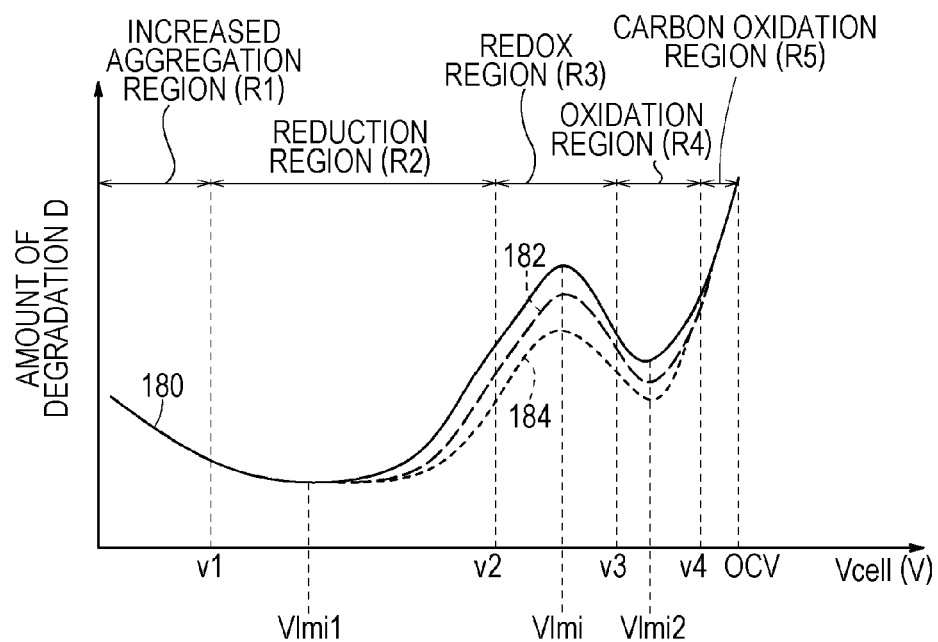
FIG. 8 is a diagram illustrating an example of the relationship between potential and cell deterioration amount of cells making up a fuel cell.

FIG. 8 illustrates an example of the relation between the potential of FC cells making up the FC stack 40 (cell voltage Vcell) of which the unit is volts (V), and amount of deterioration D of the cell. That is to say, the curves 180 through 184 in FIG. 8 represent the relation between the cell voltage Vcell and the amount of deterioration D.

In FIG. 8, in a region below a potential v1 (e.g., 0.5 V), hereinafter referred to as "increased platinum aggregation region R1" or "increased aggregation region R1", the platinum (platinum oxide) included in the FC cell as a catalyst is subjected to intense reduction reaction, resulting in excessive aggregation of the platinum. A region between the potential v1 and a potential v2 (e.g., 0.8 V) is a region where reducing reaction advances in a stable manner (hereinafter referred to as "platinum reduction region R2" or "reduction region R2").

A region between the potential v2 and a potential v3 (e.g., 0.9 V) is a region where redox reaction of the platinum advances (hereinafter referred to as "platinum redox advancing region R3", or "redox advancing region R3"). A region between the potential v3 and a potential v4 (e.g., 0.95 V) is a region where oxidizing reaction of the platinum advances in a stable manner (hereinafter referred to as "platinum stable oxidizing region R4", or "oxidizing region R4"). From potential v4 to open circuit voltage (OCV) is a region where oxidization of carbon included in the cell advances (hereinafter referred to as "carbon oxidizing region R5").

As described above, with FIG. 8, if the cell voltage Vcell is in the platinum reducing region R2 or the platinum oxidizing region R4, deterioration of the FC cell is relatively small in comparison with the neighboring regions. In the other hand, if the cell voltage Vcell is in the increased platinum aggregation region R1, platinum redox advancing region R3, or carbon oxidizing region R5, the degree of deterioration of the FC cell is relatively great as compared to the adjacent regions.

Note that, as can be seen from FIG. 8, the relation between the cell voltage Vcell and amount of deterioration D of the cell is not a simply-defined relation, and changes as indicated by curves 180 through 184 in accordance with cell voltage Vcell fluctuation amount (fluctuation velocity Acell), the unit of which is volts per second (V/s). Curve 180 indicates a case where the fluctuation velocity Acell is high (fast), curve 182 indicates a case where the fluctuation velocity Acell is medium, and curve 184 indicates a case where the fluctuation velocity Acell is low (slow). That is to say, the faster the fluctuation velocity Acell is, the more the deterioration of the FC cell advances, and the slower the fluctuation velocity Acell is, the more the deterioration of the FC cell is suppressed.

Figure 9:
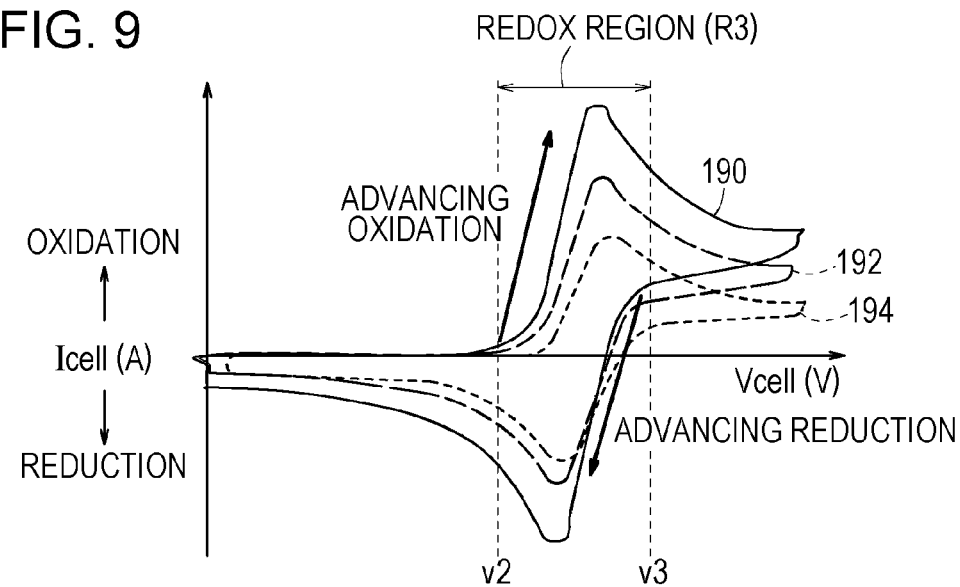
FIG. 9 is a cyclic voltammetry diagram illustrating an example of how oxidization progresses and reduction progresses in cases where the rates of change of potential of the fuel cell differ.

FIG. 9 is a cyclic voltammetry diagram illustrating an example of how oxidization progresses and reduction progresses under different cases of fluctuation velocity Acell. In FIG. 9, curve 190 indicates a case where the fluctuation velocity Acell is high (corresponding to curve 180 in FIG. 8), curve 192 indicates a case where the fluctuation velocity Acell is medium (corresponding to curve 182 in FIG. 8), and curve 194 indicates a case where the fluctuation velocity Acell is low. That is to say, the faster the fluctuation velocity Acell is, the greater the absolute values of the oxidizing current and reducing current become, and the slower the fluctuation velocity Acell is, the smaller the absolute values of the oxidizing current and reducing current become.

Thus, it can be seen that the magnitude of the oxidizing current and reducing current, and the degree of advance of oxidization and reduction, depend on the fluctuation velocity Acell, so the potentials v1 through v4 are not necessarily uniquely identified. Further, the potentials v1 through v4 may differ from one FC cell to another. Accordingly, the potentials v1 through v4 are preferably set by reflecting this margin of error in simulation values or actually-measured values.

Also, the current-voltage properties (IV properties) of the FC cell are such that, in the same way as with common fuel cells, the lower the cell voltage Vcell is, the greater the cell current Icell, of which the unit is amperes (A), is. This is the property indicated by the solid line in FIG. 10, and hereinafter may also be referred to as "normal IV property"). Also, the generated voltage of the FC stack 40 (FC voltage Vfc) is obtained by multiplying the cell voltage Vcell with the serially-connected number Nfc within the FC stack 40. This serially-connected number Nfc is the number of FC cells serially connected within the FC stack 40, and may also be referred to hereinafter as "number-of-cells Nfc".

In light of the above, with the present embodiment, at the time of the DC/DC converter 22 performing voltage conversion operations, the target voltage of the FC stack 40 (target FC voltage Vfctgt) of which the unit is volts (V), is primarily set within the platinum reducing region R2, and sometimes set within the stable platinum oxidizing region R4 as appropriate (described later in detail with reference to FIG. 10 and other drawings). Switching the target FC voltage Vfctgt in this way minimizes the time of being in the regions R1, R3, and R5 (in particular the platinum redox advancing region R3) so as to prevent deterioration of the FC stack 40.

Note that with the above-described processing, there are cases where the supplied power from the FC stack 40 (FC power Pfc) and the system load Psys are not equal. In the event that the FC power Pfc is below the system load Psys, the lack is supplied from the battery 20. Also, in the event that the FC power Pfc exceeds the system load Psys, the excess is charged to the battery.

Also, while potentials v1 through v4 have been illustrated as specific numerical values in FIG. 8, this is only to illustrate performing of control described later, and these numerical values should be decided taking into consideration accommodating control. In other words, the amount of deterioration D changes continuously as can be seen from the curves 180 through 184, so the potentials v1 through v4 may be set appropriately in accordance with control specifications.

Note however, that the platinum reducing region R2 includes a minimum value (first minimum value V1$mi$1) of the curves 180 through 184. The platinum redox advancing region R3 includes the maximum value (maximum value V1$mx$) curves 180 through 184. The stable platinum oxidizing region R4 includes another minimum value (second minimum value V1$mi$2) of the curves 180 through 184.

Now, it should be noted that there is a correlation between the fluctuation velocity Acell and amount of deterioration D, as illustrated in FIG. 8. Also, the slower the fluctuation velocity Acell is, the lower the absolute value of oxidizing current and reducing current is, and the amount of deterioration D also is lower. Accordingly, we can assume that, in the same way as with Japanese Unexamined Patent Application Publication 2009-32418, if we perform variable voltage/variable current control where both FC voltage Vfc corresponding to cell voltage Vcell and FC current Ifc corresponding to cell current Icell are made variable based on the IV properties illustrated in FIG. 10, in accordance with change in the system load Psys, and also at the same time perform rate limiting control where the fluctuation velocity Acell, of which the unit is V/s, is restricted to a predetermined velocity or lower, deterioration of the FC stack 40 including the FC cells should be able to be suppressed and the durability and reliability of the FC stack 40 improved.

However, even if fluctuation velocity Acell can be controlled as described above, with variable voltage/variable current control there is still the possibility that cell voltage Vcell may transition to a redox advancing voltage range such as the increased platinum aggregation region R1, platinum redox advancing region R3, and carbon oxidizing region R5 (in FIGS. 9 and 10, the platinum redox advancing region R3 of potential v2 through v3), and if the cell voltage Vcell actually transitions to a redox advancing voltage range, oxidizing current and reducing current flows more readily (becomes greater). Accordingly, the frequency of oxidizing reaction or reducing reaction of the catalyst (platinum) included in the FC cell increases (oxidizing reaction and reducing reaction advance more readily), and the catalyst may not return to the original specifications. Accordingly, the functions of the catalyst may deteriorate, and deterioration of the FC stack 40 including the FC cells may actually be accelerated.

Accordingly, with the present embodiment, the above-described variable voltage/variable current control is not performed. Rather, deterioration suppression control where oxidizing current and reducing current are reduced to suppress deterioration of the FC stack 40 is performed, by executing the following two controls.

That is to say, with the present embodiment, as a first control, in the state of the cell voltage Vcell corresponding to the FC voltage Vfc being fixed to a voltage value outside of the redox advancing voltage ranges (a potential in the platinum reducing region R2 or stable platinum oxidizing region R4) by the DC/DC converter 22, the airflow supplied from the cathode system 43 to the FC stack 40 is changed so as to track the system load Psys, thereby performing fixed voltage/variable output control where the output of the FC stack 40 (FC current Ifc and FC power Pfc) are changed.

Also, with the present embodiment, as a second control, in the event that there is fluctuation of the system load Psys while performing the fixed voltage/variable output control, rate limiting control is performed where the time change rate of airflow supplied to the FC stack 40 (the amount of fluctuation per time unit of air supplied to the FC stack 40) is restricted. These fixed voltage/variable output control and rate limiting control will be described below in detail.

Power Supply Control and Power Supply Modes Used with Energy Management

Figure 10:
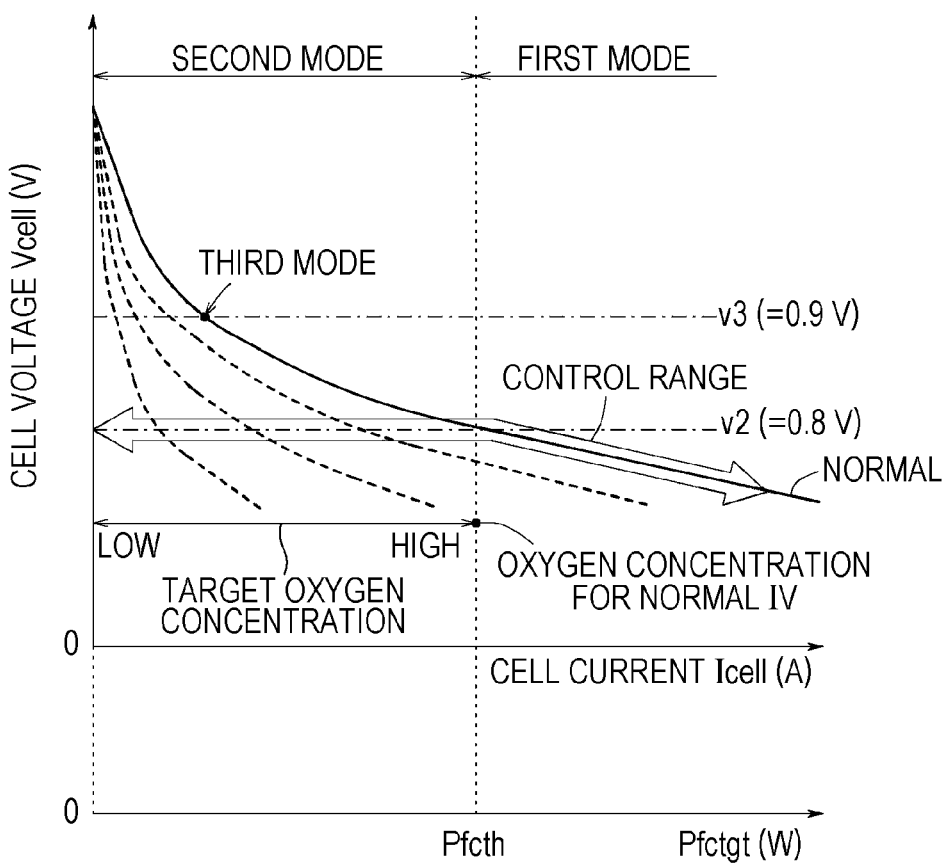
FIG. 10 is an explanatory diagram of multiple power supply modes with the embodiment.

FIG. 10 is an explanatory diagram of multiple power supply modes according to the embodiment. With the present embodiment, three control methods (power supply modes) are used as power supply control methods (power supply modes) to be used with energy management. That is, with the present embodiment, first through third modes as switched between as power supply modes (operating modes) used with energy management.

The first mode is variable voltage/variable current control (variable voltage/variable output control) where both the target FC voltage Vfctgt and FC current Ifc (FC power Pfc) are variable. The second mode is fixed voltage/variable current control (fixed voltage/variable output control) where, in the first control, the target FC voltage Vfctgt is fixed and the FC current Ifc (FC power Pfc) is variable. The third mode is fixed voltage/fixed current control (fixed voltage/fixed output control) where the target FC voltage Vfctgt is fixed and the FC current Ifc (FC power Pfc) is fixed.

The first mode (variable voltage/variable current control) is primarily performed when the system load Psys is relatively high, with the FC current Ifc being controlled by adjusting the target FC voltage Vfctgt in a state where the target oxygen concentration Cotgt fixed (or maintained in a state where oxygen is plentiful). Thus, the system load Psys can all be basically handled by the FC power Pfc.

The second mode (fixed voltage/variable current control) is primarily used when the system load Psys is relatively medium level, with the target cell voltage Vcelltgt (which is target FC voltage Vfctgt/number-of-cells Nfc) fixed to a reference potential set to a potential lower than the redox advancing region R3 (with the present embodiment, potential v2, which is 0.8 V), and also the target oxygen concentration Cotgt is basically made to be variable, whereby the FC current Ifc is made to be variable (though there are some exceptions). Thus, the system load Psys can be basically handled by the FC power Pfc (described in detail later). Insufficient FC power Pfc is supplied by assistance from the battery 20.

Also, in the event that the system load Psys fluctuates with this second mode, the rate limiting control is executed as the aforementioned second control, as a matter of course. Specifically, in the second mode, the airflow supplied from the cathode system 43 to the FC stack 40 is changed so as to track the system load Psys, while maintaining the FC voltage Vfc to potential v2×number-of-cells Nfc, whereby the FC current Ifc (FC power Pfc) is changed. Accordingly, the cell voltage Vcell can be avoided from transitioning to the platinum redox advancing region R3 between potentials v2 and v3, and oxidizing current and reducing current can be reduced. As a result, the frequency of occurrence of oxidization reaction and reduction reaction of the catalyst (platinum) included in the FC cell can be suppressed, so deterioration of the FC stack 40 including the FC cells can be suppressed while maintaining the capabilities of the catalyst.

In the event that the system load Psys fluctuates while executing the second mode, rate limiting control where the time change rate of airflow supplied from the cathode system 43 to the FC stack 40 (variation of air volume over time and fluctuation velocity of airflow) is restricted. Upon the rate limiting control being executed and the time change rate of the airflow being restricted, the time change rate of the FC stack 40 (the time change rate (fluctuation velocity) of FC current Ifc and FC power Pfc) is also restricted. As a result, oxidizing current and reducing current can be reduced even further, and deterioration of the FC stack 40 can be suppressed even further by changing the airflow supplied to the FC stack 40 and the output of the FC stack 40 while tracking the fluctuations of the system load Psys.

Note that the time change rate of airflow can be restricted by (1) restricting the driving amount of the air pump 60 (airflow or rpms Nap), (2) restricting the target FC power Pfctgt or target FC current Ifctgt, or (3) restricting the system load Psys, if the system load Psys is being controlled to track the FC power Pfc. This can be achieved in various known ways, such as increasing the feedback coefficient (dulling control response), besides using a primary delay filter.

Figure 11:
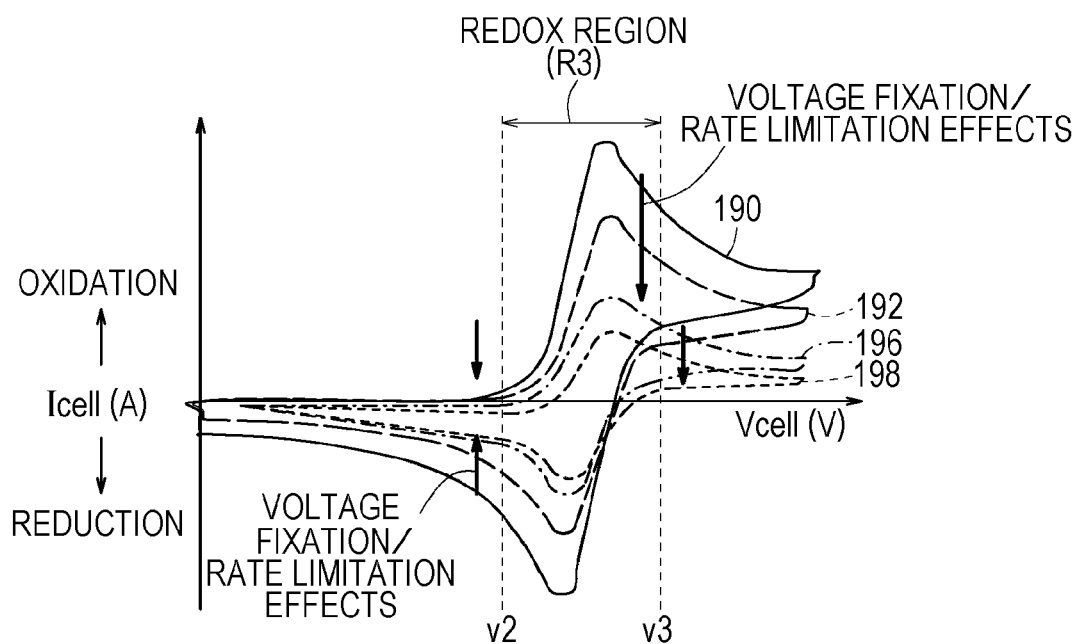
FIG. 11 is a cyclic voltammetry diagram illustrating drop in oxidizing current and reduction current in a case of executing fixed voltage/variable output control and limited rate control.

FIG. 11 illustrates the cyclic voltammetry diagram in FIG. 9 (curves 190 and 192) overlaid with a cyclic voltammetry diagram where rate limiting control is executed while executing the second mode (curves 196 and 198). Note that in FIG. 11, the curve 196 indicates a case where the time change rate of airflow supplied from the cathode system 43 (time change rate of FC current Ifc and FC power Pfc) is high, i.e., the fluctuation velocity of the airflow (fluctuation velocity of FC current Ifc and FC power Pfc) is fast, and the curve 198 indicates a case where the fluctuation velocity of the airflow (fluctuation velocity of FC current Ifc and FC power Pfc) is slow.

As described above, due to executing the second mode, oxidizing current and reducing current is reduced by fixing the cell voltage Vcell to potential v2, and oxidizing current and reducing current is reduced even further by executing rate limiting control restricting the time change rate of airflow supplied to the FC stack 40. Accordingly the curves 196 and 198 are closer overall to zero level, as compared to curves 190 and 192. That is to say, oxidizing current and reducing current is reduced in a more sure manner with the second mode and rate limiting control executed with the present embodiment, as compared with the rate limiting control as to time change rate of cell voltage Vcell (fluctuation velocity Acell) as described in Japanese Unexamined Patent Application Publication 2009-32418, so deterioration of the FC stack 40 can be effectively suppressed.

The third mode (fixed voltage/fixed current control) is primarily used when the system load Psys is relatively low, with the target cell voltage Vcelltgt (which is target FC voltage Vfctgt/number-of-cells Nfc) fixed to a potential other than the redox advancing region R3 (with the present embodiment, potential v3, which is 0.9 V), and the FC current Ifc is made to be constant. Insufficient FC power Pfc is supplied by assistance from the battery 20, and excess FC power Pfc is charged to the battery 20.

Overall Flow of Energy Management

Figure 12:
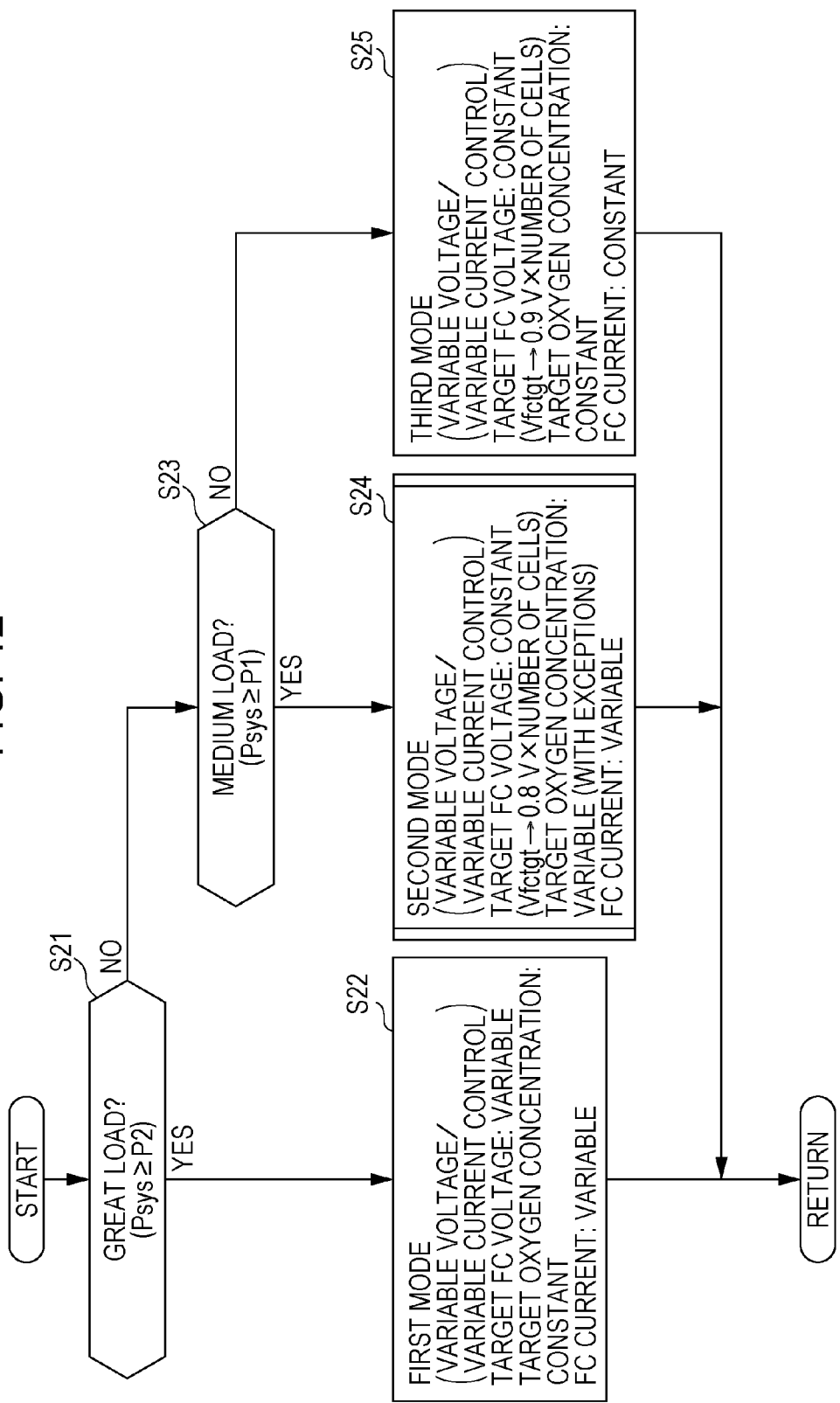
FIG. 12 is a flowchart of energy management of the FC system which the ECU performs.

FIG. 12 illustrates a flowchart where the ECU 24 performs energy management of the FC system 12 (S3 in FIG. 5). In step S21, the ECU 24 determines whether or not the FC vehicle 10 is in a high-load state. Specifically, the ECU 24 determines whether or not the system load Psys calculated in step S2 is at or above a threshold value P2 for determining a high load. "High load" as used here means a case where FC power Pfc, obtained at the time of the FC stack 40 generating electricity in a state where there is plenty of oxygen and also the cell voltage Vcell is a value within the reducing region R2 (i.e., with FC voltage Vfc a value within the reducing region R2×number-of-cells Nfc), is balanced with the system load Psys. Accordingly, the threshold value P2 is a value corresponding to the threshold value Pfcth of the target FC power Pfctgt (see FIG. 10) when switching between the first mode and the second mode.

In the event that the system load Psys is threshold value P2 (Pfcth) or greater, the FC vehicle 10 is in a high load state, and otherwise, the FC vehicle 10 is not in a high load state. Note that determination of a high load state may be made by other methods as well. For example, a high load state may be determined according to whether or not vehicular speed Vs is equal to or smaller than a threshold value THVh for determining high load states. Alternatively, a high load state may be determined according to whether or not acceleration (change in vehicular speed Vs) is equal to or smaller than a threshold value for determining high load states.

In the event that the FC vehicle 10 is in a high-load state (YES in S21), the flow advances to step S22, where the ECU 24 performs the variable voltage/variable current control according to the first mode (details to be described later). In the event that the FC vehicle 10 is not in a high-load state (NO in S21), the flow advances to step S23.

In step S23, the ECU 24 determines whether or not the FC vehicle 10 is in a medium-load state. Specifically, the ECU 24 determines whether or not the system load Psys calculated in step S2 is at or above a threshold value P1 for determining a medium load. "Medium load" as used here means a case where FC power Pfc, obtained at the time of the FC stack 40 generating electricity in a state where there is plenty of oxygen and also the cell voltage Vcell is a value within the platinum reducing region R2 (i.e., with FC voltage Vfc a value within the platinum reducing region R2×number-of-cells Nfc), is balanced with the system load Psys.

In the event that the system load Psys is threshold value P1 or greater, the FC vehicle 10 is in a medium load state, and otherwise, the FC vehicle 10 is not in a medium load state. Note that determination of a medium load state may be made by other methods as well. For example, a medium load state may be determined according to whether or not vehicular speed Vs is equal to or smaller than a threshold value THVm for determining medium load states. Alternatively, a medium load state may be determined according to whether or not acceleration (change in vehicular speed Vs) is equal to or smaller than a threshold value for determining medium load states.

In the event that the FC vehicle 10 is in a medium-load state (YES in S23), the flow advances to step S24, where the ECU 24 performs the fixed voltage/variable current control according to the second mode (details to be described later with reference to FIG. 14). In the event that the FC vehicle 10 is not in a medium-load state (NO in S23), the flow advances to step S25, where the ECU 24 performs the fixed voltage/fixed current control according to the third mode (details to be described later).

Executing First Mode

As described above, the first mode is primarily used when the system load Psys is relatively high, and the FC current Ifc is controlled by adjusting the target FC voltage Vfctgt in a state with the target oxygen concentration Cotgt fixed (or in a state with plenty of oxygen. That is to say, as illustrated in FIG. 10, with the first mode, the normal IV property of the FC stack 40 is used (normal IV property illustrated in FIG. 10 with a solid line). In the same way as with a normal fuel cell, the normal IV property of the FC stack 40 is such that the lower the cell voltage Vcell (FC voltage Vfc) is, the greater the cell current Icell (FC current Ifc) is. Accordingly, with the first mode, the target FC current Ifctgt is calculated in accordance with the system load Psys, and further the target FC voltage Vfctgt corresponding to the target FC current Ifctgt is calculated. The ECU 24 then controls the DC/DC converter 22 such that the FC voltage Vfc becomes the target FC voltage Vfctgt. That is to say, the primary voltage V1 is boosted by the DC/DC converter 22 so that the secondary voltage V2 becomes the target FC voltage Vfctgt, thereby controlling the FC voltage Vfc and controlling the FC current Ifc.

Figure 13:
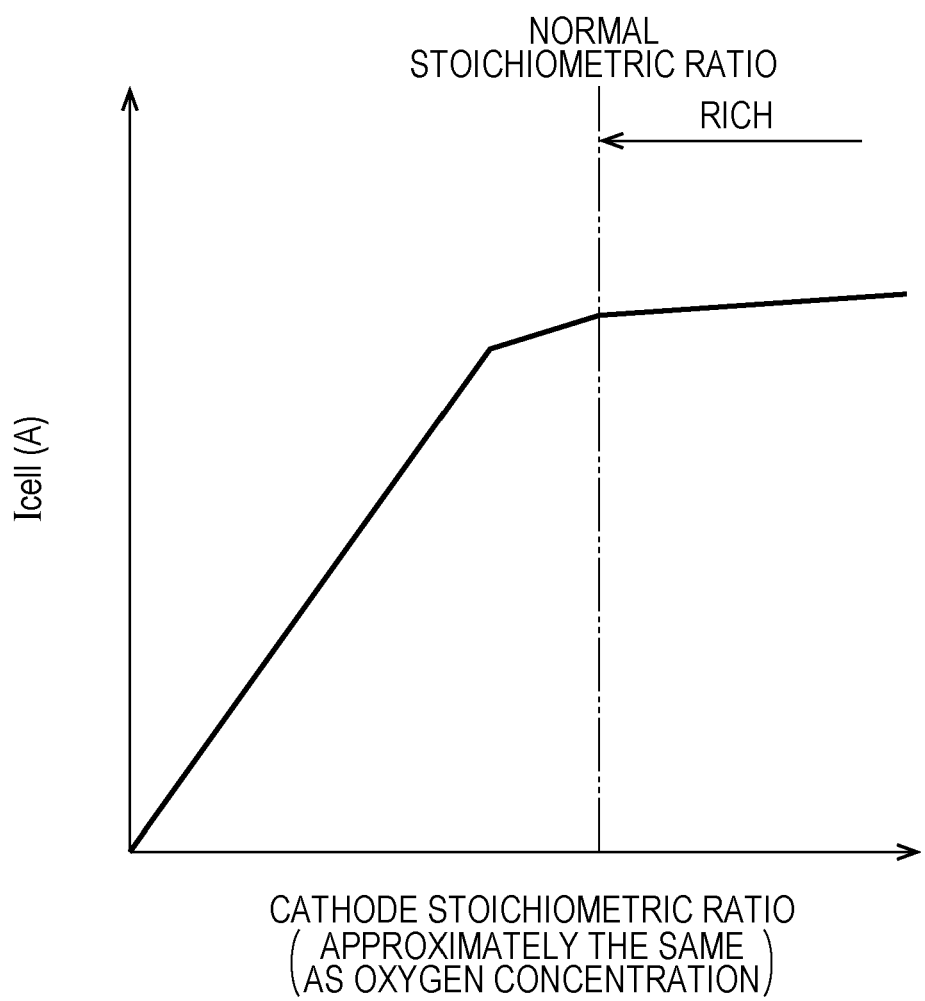
FIG. 13 is a diagram illustrating the relationship between cathode stoichiometric ratio and cell current.

Note a state where there is plenty of oxygen means oxygen of a region at or above the normal stoichiometric ratio where the cell current Icell is generally constant even if the cathode stoichiometric ratio is raised, as illustrated in FIG. 13 for example, and is in a substantially saturated state. This holds the same as with a case where there is plenty of hydrogen. Note that the cathode stoichiometric ratio is obtained by dividing the airflow supplied to the cathode channel 74 by the airflow consumed by the FC stack 40, and approximates the oxygen concentration at the cathode channel 74. Accordingly, the cathode stoichiometric ratio is a value corresponding to the airflow supplied from the cathode system 43 to the FC stack 40. Also, adjustment of the cathode stoichiometric ratio is performed by controlling the oxygen concentration, for example. According to the first mode such as described above, even if the system load Psys is a high load, basically all of the system load Psys can be handled by the FC power Pfc.

Executing Second Mode

As described above, the second mode is primarily used when the system load Psys is relatively medium level, with the target cell voltage Vcelltgt (which is target FC voltage Vfctgt/number-of-cells Nfc) fixed to a reference potential set to a potential lower than the redox advancing region R3 (with the present embodiment, potential v2, which is 0.8 V), and also the target oxygen concentration Cotgt is basically made to be variable, whereby the FC current Ifc is made to be variable.

That is to say, with the second mode, the oxygen concentration Co is lowered by lowering the target oxygen concentration Cotgt in a state with the cell voltage Vcell maintained constant, as illustrated in FIG. 10. As illustrated in FIG. 13, lowering the cathode stoichiometric ratio (oxygen concentration Co) also lowers the cell current Icell (FC current Ifc). Accordingly, increasing or reducing the target oxygen concentration Cotgt while maintaining the cell voltage Vcell constant enables the cell current Icell (FC current Ifc) and FC power Pfc to be controlled. Insufficient FC power Pfc is supplied by assistance from the battery 20.

Figure 14:
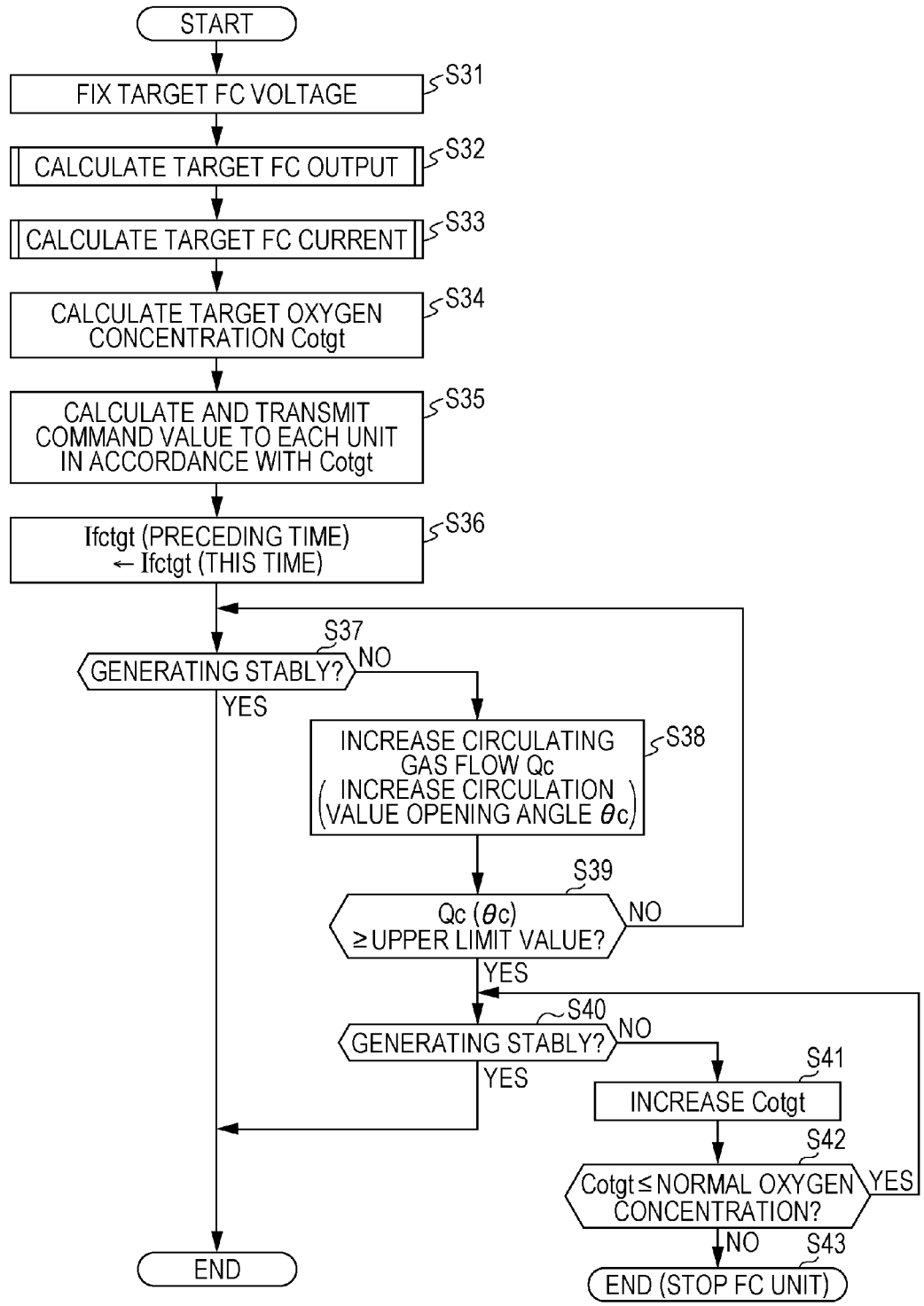
FIG. 14 is a flowchart of a second mode.

FIG. 14 illustrates a flowchart of the second mode. In step S31, the ECU 24 adjusts the boost rate of the DC/DC converter 22 so as to fix the target FC voltage Vfctgt to a reference potential set to a potential lower than the redox advancing region R3 (with the present embodiment, potential v2, which is 0.8 V).

In step S32, the ECU 24 calculates the target FC output (target FC power) Pfctgt corresponding to the system load Psys (details to be described later with reference to FIG. 20 and other drawings).

In step 33, the ECU 24 calculates the target FC current Ifctgt corresponding to the FC output Pfctgt (details to be described later with reference to FIG. 25 and other drawings).

Figure 15:
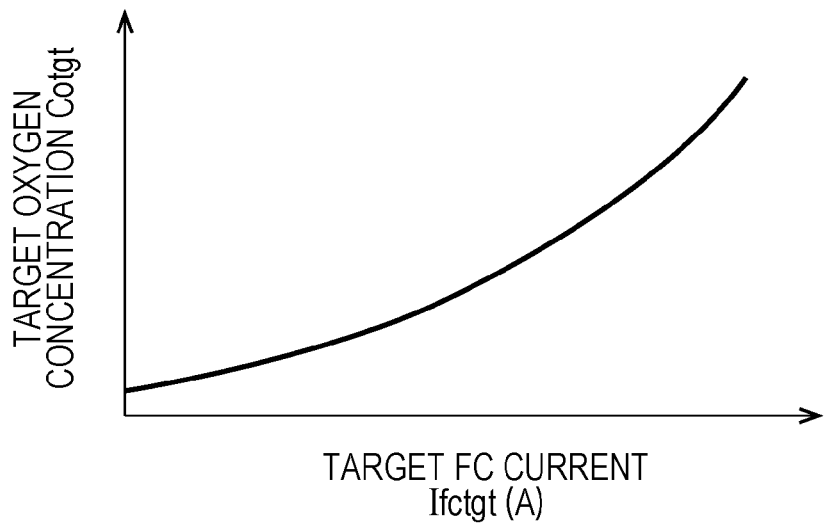
FIG. 15 is a diagram illustrating the relationship between target FC current and target oxygen concentration in the second mode.

In step S34, the ECU 24 calculates the target oxygen concentration Cotgt corresponding to the target FC current Ifctgt, assuming that the target FC voltage Vfctgt is the reference potential (see FIGS. 13 through 15). Note that FIG. 15 illustrates the relation between the target FC current Ifctgt and the target oxygen concentration Cotgt in the event that the FC voltage Vfc is the reference potential.

In step S35, the ECU 24 calculates and transmits command values to each part in accordance with the target oxygen concentration Cotgt. The command values calculated here include the revolutions of the air pump 60 (hereinafter referred to as "air pump revolutions Nap" or simply "revolutions Nap"), the revolutions of the water pump 80 (hereinafter referred to as "water pump revolutions Nwp" or simply "revolutions Nwp"), opening angle of the back-pressure valve 64 (hereinafter referred to as "back-pressure valve opening angle θbp" or simply "opening angle θbp"), and the opening angle of the circulation valve 66 (hereinafter referred to as "circulation valve opening angle θc" or simply "opening angle θc").

Figure 16:
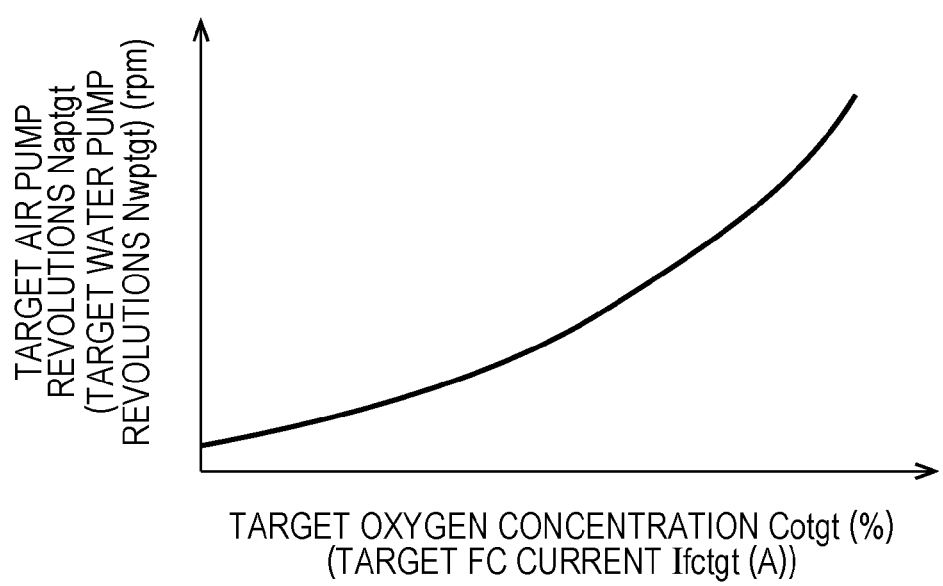
FIG. 16 is a diagram illustrating the relationship between target oxygen concentration, target FC current, and target air pump revolutions and target water pump revolutions in the second mode.
Figure 17:
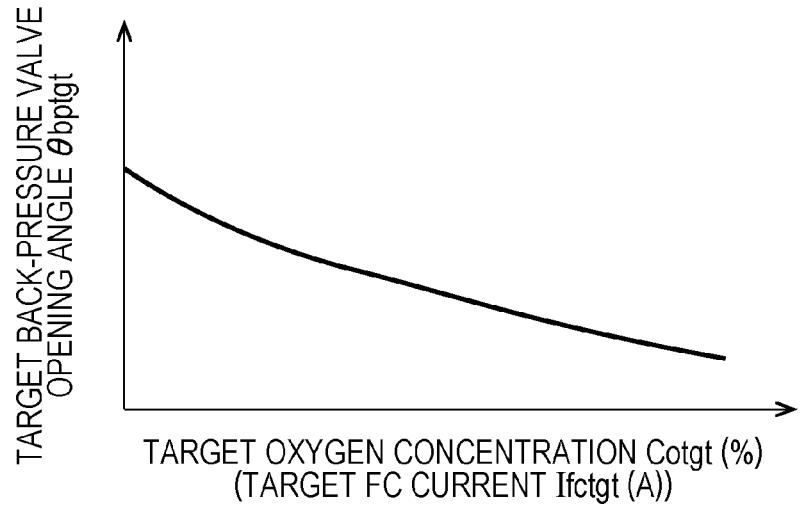
FIG. 17 is a diagram illustrating the relationship between target oxygen concentration, target FC current, and target back-pressure valve opening angle.

That is to say, as illustrated in FIGS. 16 and 17, the target air pump revolutions Naptgt, target water pump revolutions Nwptgt, and target back-pressure valve opening angle θbptgt are set in accordance with the target oxygen concentration Cotgt. Note that the target opening angle θctgt of the circulation valve 66 is set to an initial value (e.g., an opening angle where the circulation gas is zero).

In step S36, the ECU 24 sets the target FC current Ifctgt calculated this time in step S33, i.e., Ifctgt (this time), to the target FC current Ifctgt from the preceding time, i.e., (preceding time), so as to be used with the processing in step S33 the next time the second mode is executed.

In FIG. 37, the ECU 24 determines whether or not the FC stack 40 is stably generating electric power. This determination is made by the ECU 24 determining that the electric power generation of the FC stack 40 is unstable in the event that the voltage of the lowest cell input from the cell voltage monitor 42 is lower than the a voltage obtained by subtracting a predetermined voltage from the average cell voltage, i.e., if lowest cell voltage<(average cell voltage−predetermined voltage) holds. The predetermined voltage may be, for example, an experiment value, simulation value, or the like.

In the event that electric power generating is stable (YES in S37), the processing this time ends. In the event that electric power generating is not stable (NO in S37), the flow advances to step S38.

Figure 18:
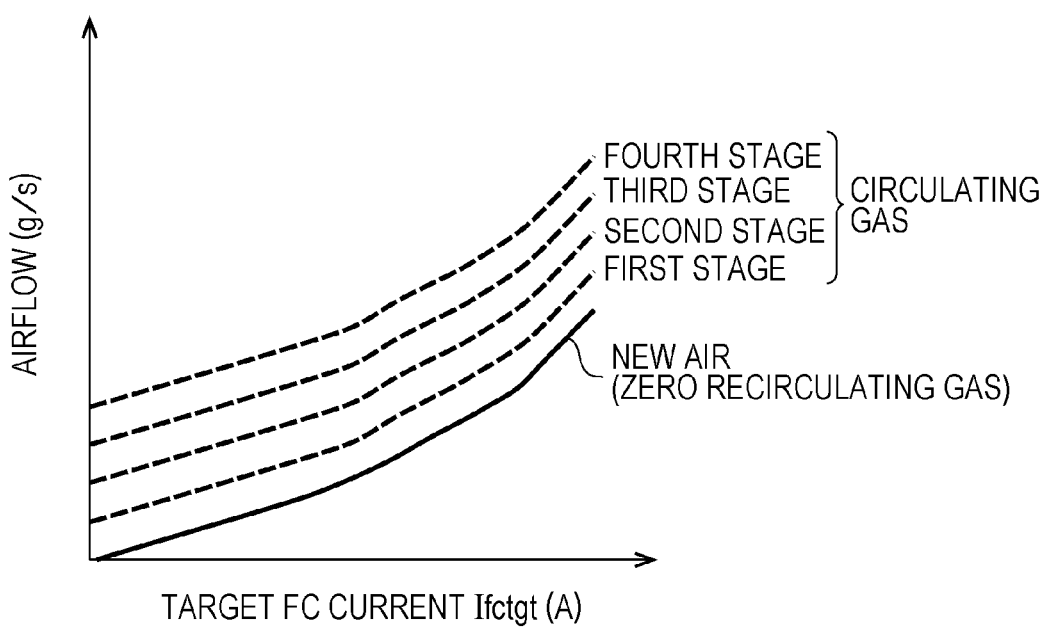
FIG. 18 is a diagram illustrating the relationship between target FC current and airflow in the second mode.

In step S38, the ECU 24 monitors the circulation gas flow Qc, of which the unit is g/s, using the control unit 70, and increases the opening angle θc of the circulation valve 66 and also increases the flow Qc by one step (see FIG. 18). Note that in FIG. 18, in the event that the circulation valve 66 is fully opened, the flow Qc is an increase to the fourth step, which is the maximum flow.

Note however, if the opening angle θc of the circulation valve 66 increases, the percentage of circulating gas in the suctioned gas being suctioned by the air pump 60 increases. That is to say, the ratio of the fresh air (suctioned from outside of the vehicle) and the circulating gas changes, with the percentage of the circulating gas increasing. Accordingly, the capability of distributing oxygen to all single cells improves. Note that the oxygen concentration Co of the circulating gas (cathode off-gas) of the circulating gas is lower than the oxygen concentration Co of fresh air. Accordingly, in the event that the revolutions Nap of the air pump 60 and the opening angle θbp of the back-pressure valve 64 are the same before control of the opening angle θc of the circulation valve 66, the oxygen concentration Co of the gas passing through the cathode channel 74 will drop.

Accordingly, in step S38, at least one of the revolutions Nap of the air pump 60 and the opening angle θbp of the back-pressure valve 64 is preferably reduced in conjunction with the increase of the flow Qc of circulating gas, so that the target oxygen concentration Cotgt calculated in step S34 is maintained. For example, in the event of having increased the flow Qc of circulating gas, the revolutions Nap of the air pump 60 are preferably increased to increase the flow of fresh air. Accordingly, the overall flow of gas heading toward the cathode channel 74 (mixed gas of fresh air and circulating gas) increases, so distribution capabilities of oxygen to all single cells improves, and generating capabilities of the FC stack 40 are restored more readily.

Thus, fresh air is merged with the circulating gas while maintaining the target oxygen concentration Cotgt, so the volume flow of gas (in units of liters per second (L/s)) of passing through the cathode channel 74 increases. Accordingly, gas of which the volume flow has increased while maintaining the oxygen concentration Co more readily reaches all parts of the cathode channel 74 which has a complicated shape within the FC stack 40. Accordingly, the gas is more readily supplied to all single cells in the same way, so instability in generation at the FC stack 40 is more readily resolved. Also, droplets (condensed water, etc.) on the surface of a membrane-electrode assembly (MEA) and the walls surrounding the cathode channel 74 are more readily removed.

In step S39, the ECU 24 determines whether or not the circulating gas flow Qc detected at the control unit 70 is at or above an upper limit value. The upper limit value serving as a determination reference is set to the value where the opening angle θc of the circulation valve 66 is fully open. In this case, even if the circulation valve opening angle θc is unchanged, of the air pump revolutions Nap detected at the control unit 70 increase, the circulating gas flow Qc detected at the control unit 70 increases, so the upper limit value is preferably set in correlation with the air pump revolutions Nap, i.e., such that the greater the air pump revolutions Nap of the air pump 60 is, the greater the upper limit value is.

In the event that determination is made that the circulating gas flow Qc is not at or above the upper limit value (NO in step S39), the flow returns to step S37. In the event that determination is made that the circulating gas flow Qc is at or above the upper limit value (YES in step S39), the flow advances to step S40.

Note that in steps S38 and S39, processing has been described as being executed based on the circulating gas flow Qc directly detected by the control unit 70, but processing may be executed based on the circulation valve opening angle θc. That is to say, a configuration may be made wherein the circulation valve opening angle θc is increased one step (e.g., 30°) in the opening direction in step S38, and in the event that the circulation valve 66 is fully open in step S39 (YES in S39), the flow advances to step S40.

Figure 19:
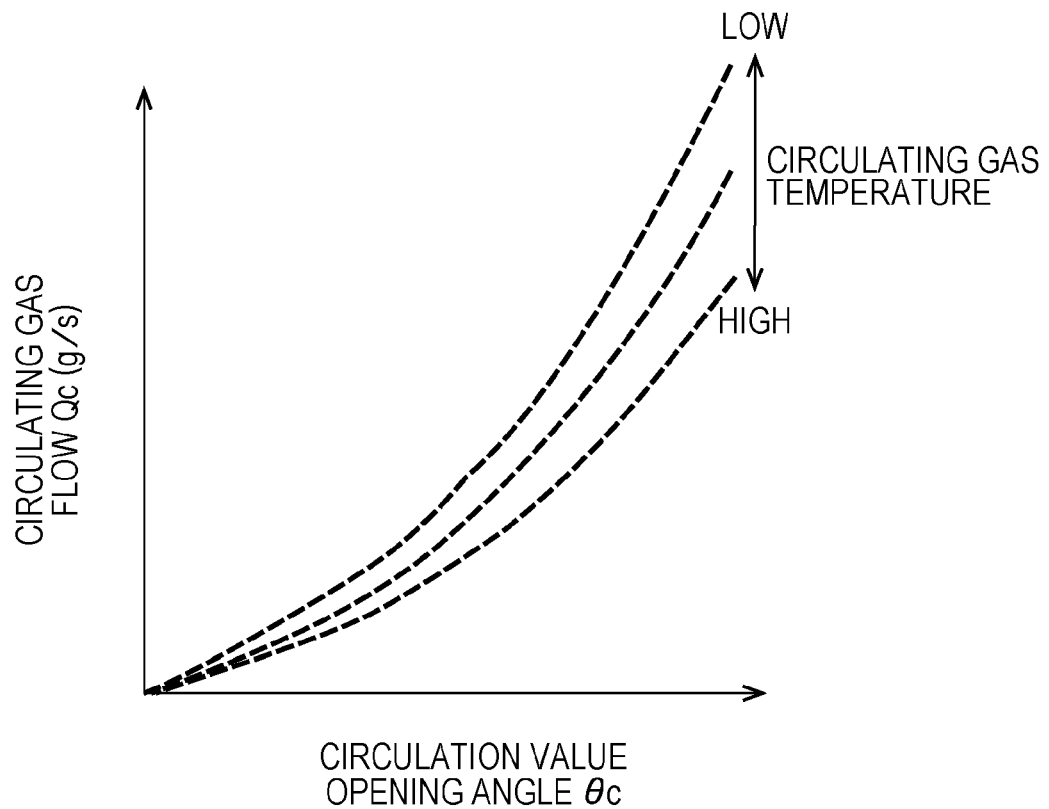
FIG. 19 is a diagram illustrating the relationship between recirculation valve opening angle and recirculation gas flow.

Also, in this case, the circulating gas flow Qc may be calculated in terms of grams per second (g/s) based on the opening angle θc of the circulation valve 66, the temperature of the circulating gas, and the map illustrated in FIG. 19. As illustrated in FIG. 19, the higher the temperature of the circulating gas is, the lower the density thereof is, so the relationship is one where the flow Qc in terms of grams per second (g/s) decreases.

In step S40, the ECU 24 determines whether or not generation of electric power is stable, in the same way as with step S37. In the event that electric power generating is stable (YES in S40), the processing this time ends. In the event that electric power generating is not stable (NO in S40), the flow advances to step S41.

In step S41, the ECU 24 advances the target oxygen concentration Cotgt by one step (toward normal concentration). Specifically, at least one of increasing the air pump revolutions Nap and reducing the opening angle θbp of the back-pressure valve 64 is performed by one step.

In step S42, the ECU 24 determines whether or not the target oxygen concentration Cotgt is at or below the target oxygen concentration (normal oxygen concentration Conml) in normal IV properties. In the event that the target oxygen concentration Cotgt is at or below the normal oxygen concentration Conml (YES in S42), the flow returns to step S40. In the event that the target oxygen concentration Cotgt is not at or below the normal oxygen concentration Conml (NO in S42), the flow advances to step S43.

In step S43, the ECU 24 shuts down the FC unit 18. That is to say, the ECU 24 stops supply of hydrogen and air to the FC stack 40, and stops generation at the FC stack 40. The ECU 24 then lights a warning lamp, not illustrated in the drawings, to notify the driver of an abnormality at the FC stack 40. The ECU 24 still supplies power to the motor 14 from the battery 20, so the FC vehicle 10 keeps driving.

According to the second mode as described above, in the event that the system load Psys is medium load, the system load Psys can all be basically handled by the FC power Pfc, by adjusting the oxygen concentration Co (cathode stoichiometric ratio) in a state where the cell voltage Vcell is constant.

Calculation of Target FC Output Pfctgt in Second Mode

Figure 20:
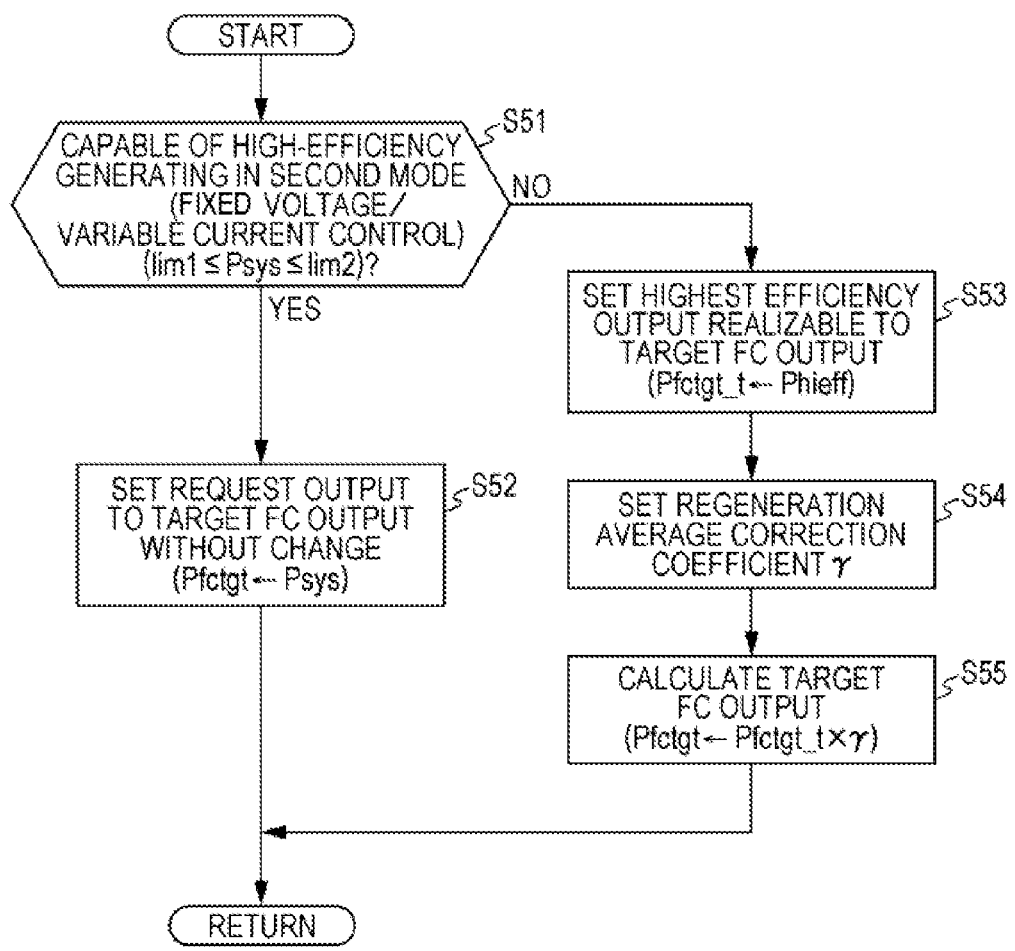
FIG. 20 is a flowchart for calculating target FC output in the second mode.

FIG. 20 is a flowchart for calculating the target FC output Pfctgt in the second mode (details of S32 in FIG. 14). In step S51, the ECU 24 determines whether or not relatively highly efficient generating of electric power can be performed in the second mode. Specifically, determination is made regarding whether or not the system load Psys is at or above a lower limit value lim1 and at or below an upper limit value lim2. The lower limit value lim1 and upper limit value lim2 will be described with reference to FIG. 21.

Figure 21:
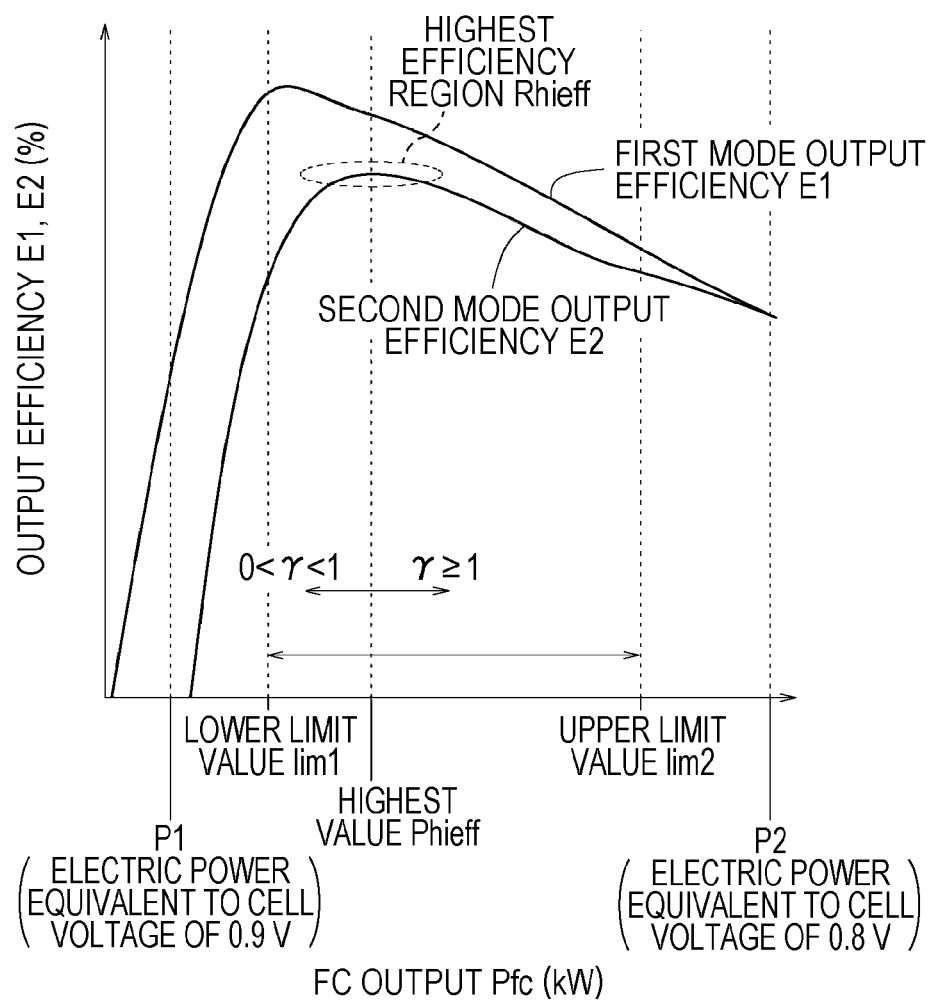
FIG. 21 is a diagram illustrating the relationship between FC output and FC unit output efficiency for each of the first mode and second mode.

FIG. 21 is a diagram illustrating the relation between FC power Pfc and the output efficiencies E1 and E2 of the FC unit 18, for the first mode and the second mode, respectively. The output efficiency E1 of the first mode is obtained by the following Expression (1).

$$E1=(Pfcm1-Pap-Ppg)/Eh \quad (1)$$

In Expression (1) above, Pfcm1 represents the FC power Pfc at the normal stoichiometric ratio in a case of using a predetermined amount (unit amount) of hydrogen (hereinafter referred to as "first-mode FC power Pfcm1"), the unit of which is kilowatts (kW). Pap represents the electric power consumption of the air pump 60 in a case of using a predetermined amount of hydrogen (hereinafter referred to as "air pump power consumption Pap", the unit of which is kilowatts (kW). Ppg represents the hydrogen energy discharged from the purge valve 50 in a case of using a predetermined amount of hydrogen (hereinafter referred to as "purge power consumption Ppg"), the unit of which is kilowatts (kW). Eh represents the energy which the predetermined amount of hydrogen holds (hereinafter referred to as "hydrogen energy Eh"), the unit of which is kilowatts (kW).

The output efficiency E2 of the second mode is obtained by the following Expression (2).

$$E2=(Pfcm2-Pap-Ppg)/Eh \quad (2)$$

In Expression (2) above, Pfcm2 represents the FC power Pfc when changing the oxygen concentration Co in a case of using a predetermined amount of hydrogen (hereinafter referred to as "second-mode FC power Pfcm2"), the unit of which is kilowatts (kW). The air pump power consumption Pap, purge power consumption Ppg, and hydrogen energy Eh are the same as with Expression (1).

As illustrated in FIG. 21, at a region where FC power Pfc is close to zero, an increase in FC power Pfc causes an increase in both output efficiencies E1 and E2, after which they gradually drop. This is due to the effects of electricity generating efficiency of the FC stack 40 itself, as described below.

Figure 22:
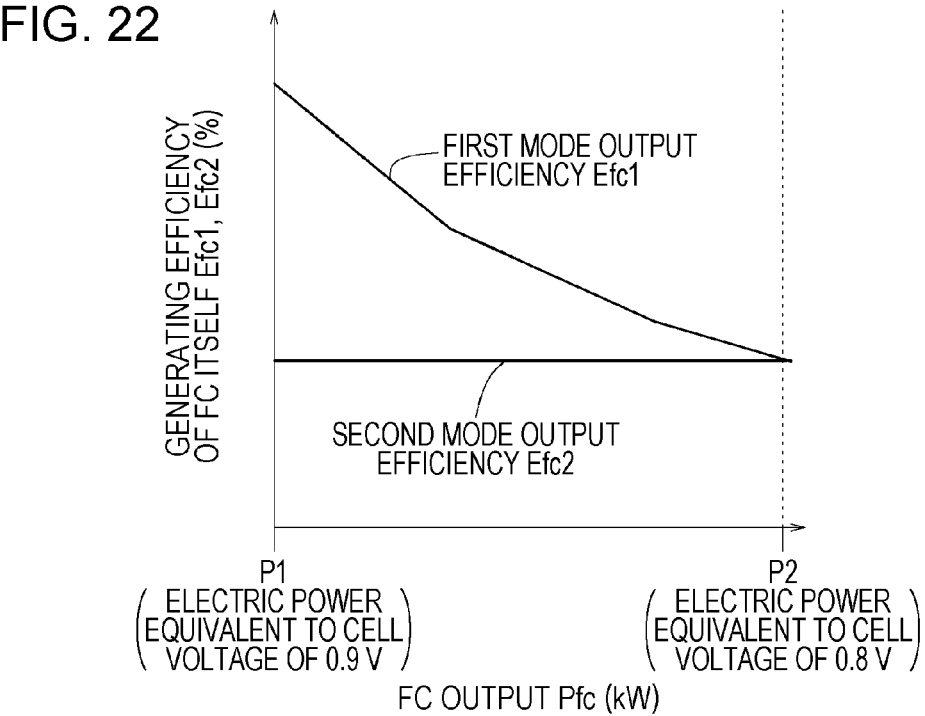
FIG. 22 is a diagram illustrating the relationship between FC output and FC proper output efficiency for each of the first mode and second mode.

FIG. 22 is a diagram illustrating the relation between the FC power Pfc and the efficiencies E1 and E2 of the FC stack 40 itself in terms of percent (%), for the first mode and second mode, respectively. The first-mode generating efficiency Efc1 is obtained by dividing the first-mode FC power Pfcm1 by the hydrogen energy Eh (Efc1=Pfcm1/Eh). The second-mode generating efficiency Efc2 is obtained by dividing the second-mode FC power Pfcm2 by the hydrogen energy Eh (Efc2=Pfcm2/Eh).

As illustrated in FIG. 22, the greater the FC power Pfc is, the lower the first-mode generating efficiency Efc1 of the FC stack 40 itself in the first mode is. This is because while the FC voltage Vfc is variable with the first mode, each FC cell emits more heat when the cell voltage Vcell is low (i.e., when the FC power Pfc is high). On the other hand, the second-mode generating efficiency Efc2 of the FC stack 40 itself in the second mode does not change with the FC power Pfc (constant in FIG. 22). This is because the FC power Pfc is constant with the second mode, so the heat emission of each FC cell is constant. These properties of the generating efficiencies Efc1 and Rfc2 are what make the output efficiencies E1 and E2 to be what they are in FIG. 21 for the overall FC unit 18.

As illustrated in FIG. 21, the output efficiency E1 in the first mode is basically higher than the output efficiency E2 in the second mode, if the FC power Pfc is the same. Also, in FIG. 21, P1 is the FC power Pfc corresponding to a case where the cell voltage Vcell is v3, i.e., 0.9 V, while P2 is the FC power Pfc corresponding to a case where the cell voltage Vcell is v2, i.e., 0.8 V.

As described above, with the first mode, the FC voltage Vfc (cell voltage Vcell) is variable and FC current Ifc and FC power Pfc are controlled. Accordingly, with the first mode, between FC power P1 to FC power P2 corresponds to a case of the cell voltage Vcell changing between potential v2 and potential v3. On the other hand, with the second mode, the FC voltage Vfc (cell voltage Vcell) is fixed and the target oxygen concentration Cotgt is variable, thereby adjusting the FC current Ifc and FC power Pfc. Accordingly, with the second mode, between FC power P1 to FC power P2 corresponds to a case of the cell voltage Vcell remaining constant at v2 (FC voltage Vfc constant at potential v2×number-of-cells Nfc).

Next, the lower limit value lim1 and upper limit value lim2 will be described. As described above, the lower limit value lim1 and upper limit value lim2 are used with the second mode, and as illustrated in FIG. 21, are set across a highest-efficiency region Rhieff for output efficiency E2. This highest-efficiency region Rhieff is a region including the highest value (hereinafter referred to as "highest-efficiency realization output Phieff" or simply "highest value Phieff") and nearby values.

The lower limit value lim1 and upper limit value lim2 can be set as follows, for example. That is to say, let us assume that the lower limit value lim1 and upper limit value lim2 are the FC power Pfc realizing values lower than the output efficiency E2 corresponding to the highest value Phieff by a predetermined value ΔX %. This predetermined value ΔX can be changed while actually driving the FC vehicle 10, so as to select a value where the fuel efficiency is the highest. Note that lower limit value lim1 and upper limit value lim2 may be set individually, as well.

Returning to FIG. 20, in the event that system load Psys is at lower limit value lim1 or above and at upper limit value lim2 or below (YES in S51), the flow advances to step S52, where the ECU 24 sets the system load Psys to the target FC power Pfctgt without change (Pfctgt Psys).

In the event that system load Psys is not at lower limit value lim1 or above and at upper limit value lim2 or below (No in S51), This means that relatively effective generation of electricity is not performable in the second mode (see FIG. 21). Accordingly, the flow advances to step S53, where the highest-efficiency realization output Phieff is set to a temporary target FC output Pfctgt_t (Pfctgt_t→Phieff).

In step S54, the ECU 24 sets a regeneration average correction coefficient γ (hereinafter also referred to as "coefficient γ") in accordance with regeneration average power Pregave and the SOC of the battery. The regeneration average power Pregave is the average of transition of regeneration power Preg over a predetermined period (e.g., a value set between 1 minute and 30 minutes), the unit of which is kilowatts per minute (kW/min), and indicates regeneration history. The coefficient γ is a coefficient for correcting the temporary target FC power Pfctgt_t in accordance with the outlook on regeneration power Preg.

Figure 24:
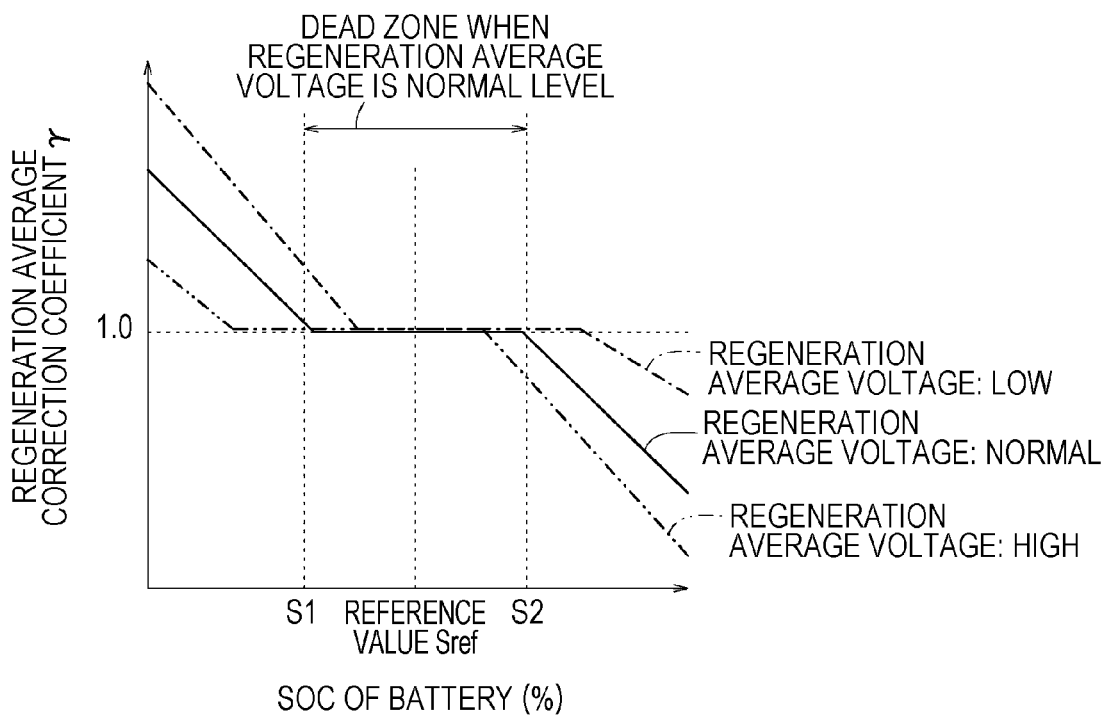
FIG. 24 is a diagram illustrating the relationship between battery state of charge (SOC) and regeneration average correction coefficient.

FIG. 24 is a diagram illustrating the relation between the SOC of the battery and the coefficient γ, for each regeneration average power Pregave. The property indicated by the solid line is a property indicating the relation between the SOC and coefficient γ in a case where the regeneration average power Pregave is normal. The property indicated by the single-dot broken line is a property indicating the relation between the SOC and coefficient γ in a case where the regeneration average power Pregave is below normal, and the property indicated by the double-dot broken line is a property indicating the relation between the SOC and coefficient γ in a case where the regeneration average power Pregave is above normal. The reference value Sref is a target value for the SOC.

As can be seen from FIG. 24, in the event that regeneration average power Pregave is low in a state where the battery SOC exceeds the reference value Sref, the coefficient γ is a value close to 1 even if the SOC deviates from the reference value Sref. On the other hand, in the event that regeneration average power Pregave is great in a state where the battery SOC exceeds the reference value Sref, the coefficient γ deviates greatly from 1 if the SOC deviates from the reference value Sref. Multiplying this coefficient γ by the temporary target FC power Pfctgt_t allows the SOC to be maintained at or near the reference value Sref.

In addition to this, with the present embodiment, a region where the coefficient γ is kept unchanging at 1 (dead zone) is provided. For example, in the event that the regeneration average power Pregave is normal, between S1 and S2 for the battery SOC is the dead zone.

When selecting the coefficient γ, the ECU 24 first selects the property of the SOC and coefficient γ in accordance with the regeneration average power Pregave. Next, the coefficient γ is selected in accordance with the SOC. Note that the relationship between the regeneration average power Pregave, SOC, and coefficient γ, may be obtained using simulation results, and may be stored in a storage unit of the ECU 24 (not illustrated) beforehand.

Returning to FIG. 20, in step S55, the ECU 24 multiplies the temporary target FC power Pfctgt_t by the coefficient γ to obtain the target FC output Pfctgt. Upon the target FC output Pfctgt_thus having been established, the ECU 24 then executes the processing of step S33 to establish the target FC current Ifctgt corresponding to the target FC output Pfctgt.

Calculation of Target FC Current Ifctgt in Second Mode

Figure 25:
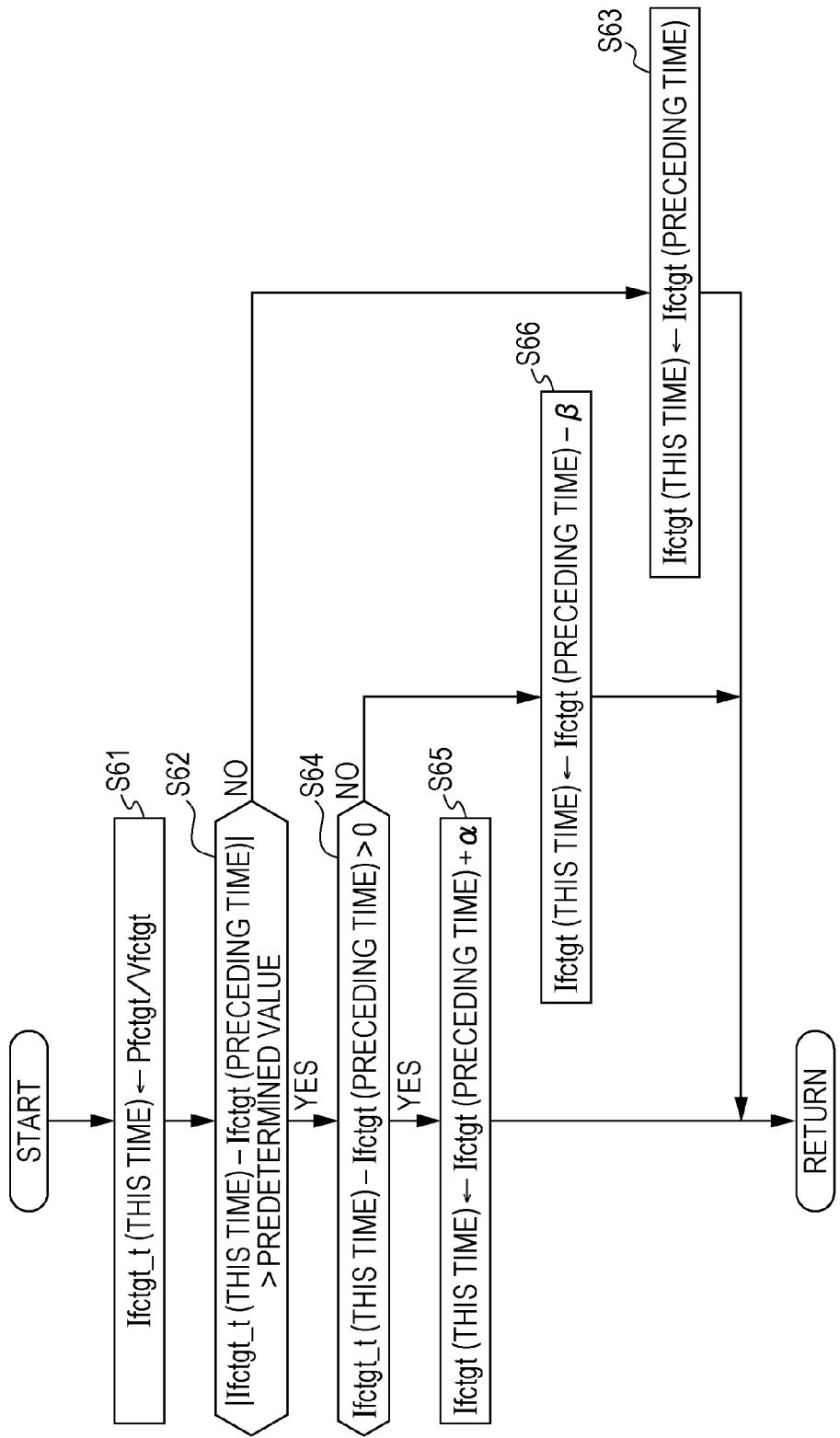
FIG. 25 is a flowchart for calculating target Fc current in the second mode.

FIG. 25 is a flowchart for calculating the target FC current Ifctgt in the second mode (details of S33 in FIG. 14). In step S61, the ECU 24 divides the target FC output Pfctgt set in step S32 in FIG. 14 by the target FC voltage Vfctgt set in step S31, and sets the result value of the division Pfctgt/Vfctgt as the temporary target FC current Ifctgt_t (this time) in execution of the second mode this time.

In step S62, the ECU 24 obtains the absolute value between the temporary target FC current Ifctgt_t (this time) with the temporary target FC current Ifctgt_t (preceding time) set the preceding time in step S36 of FIG. 14, i.e., obtains |Ifctgt_t (this time)–Ifctgt_t (preceding time)|, and determines whether or not the obtained absolute value is greater than a predetermined value.

In the event that determination is made in step S62 that the absolute value is within the predetermined value (NO in S62), the ECU 24 determines that there is either no change in the system load Psys, or the amount of change in the system load Psys is so small that no rate limiting control has to be executed, and decides to not perform (or to stop) rate limiting control. The flow then proceeds to step S63, where the ECU 24 sets the temporary target FC current Ifctgt_t (preceding time) of the preceding time as the target FC current Ifctgt for executing the second mode this time.

In the event that determination is made in step S62 that the absolute value exceeds the predetermined value (YES in S62), the ECU 24 determines that there has occurred change in the system load Psys, and decides to execute (continue) rate limiting control. The flow then proceeds to step S64, where the ECU 24 determines whether or not the difference between the temporary target FC current Ifctgt_t (this time) and the temporary target FC current Ifctgt_t (preceding time), i.e., Ifctgt_t (this time)–Ifctgt_t (preceding time), is greater than 0.

In the event that determination is made in step S64 that the difference is greater than 0 (YES in S64), i.e., that the temporary target FC current Ifctgt_t (this time) is greater than the temporary target FC current Ifctgt_t (preceding time) due to increase in system load Psys (FC current Ifc is increasing), in step S65 the ECU 24 sets a value obtained by adding a predetermined value α to the temporary target FC current Ifctgt_t (preceding time), i.e., Ifctgt_t (preceding time)+α, as the target FC current Ifctgt for executing the second mode this time.

On the other hand, in the event that determination is made in step S64 that the difference is not greater than 0 (NO in S64), i.e., that the temporary target FC current Ifctgt_t (this time) is not greater than the temporary target FC current Ifctgt_t (preceding time) due to decrease in system load Psys (FC current Ifc is decreasing), in step S66 the ECU 24 sets a value obtained by subtracting a predetermined value R from the temporary target FC current Ifctgt_t (preceding time), i.e., Ifctgt_t (preceding time)−β, as the target FC current Ifctgt for executing the second mode this time.

Thus, the ECU 24 can set the target FC current Ifctgt. Now, it should be noted that (1) the target FC current Ifctgt (this time) set in step S63 is the target FC current Ifctgt in the event that no rate limiting control is to be performed, (2) the target FC current Ifctgt (this time) set in step S65 is the target FC current Ifctgt in the event of executing rate limiting control when the system load Psys is increasing, and (3) the target FC current Ifctgt (this time) set in step S66 is the target FC current Ifctgt in the event of executing rate limiting control when the system load Psys is decreasing.

Accordingly, in step S34 in FIG. 14, in the case of the target FC current Ifctgt according to (1) above, the ECU 24 calculates the target oxygen concentration Cotgt for a case of not performing rate limiting control, and in the case of the target FC current Ifctgt according to (2) or (3) above, the ECU 24 calculates the target oxygen concentration Cotgt for a case of performing rate limiting control. Accordingly, by the ECU 24 calculating and transmitting a command value corresponding to the target oxygen concentration Cotgt, only the second mode is executed in the case of (1) above, and rate limiting control is executed along with the second mode in the case of (2) or (3) above.

Note that at the time of the system load Psys increasing in (2), rate limiting control is performed as to increase of the air supply amount (oxygen concentration Co), so there is a possibility that the airflow supplied to the FC stack 40 will be insufficient and generating electricity at the FC stack 40 will become unstable (NO in step S37). Even if such a situation occurs, performing steps S38 through S42 in accordance with the generating state of the FC stack 40 to ensure stability of minimally needed electric power generation will result in increased air supply, so the stability of generating electricity at the FC stack 40 can be maintained.

Now, the predetermined values α and β preferably are such that α>β. For example, when the FC current Ifc is rising, air will be supplied to the FC stack 40 starved of fuel, so the airflow to the FC stack 40 needs to be increased. Accordingly, setting the predetermined value α so as to be greater than the predetermined value β such that the target FC current Ifctgt (this time) is greater than the target FC current Ifctgt (last time), the change (increase) in FC current Ifc will track the change in the air pump revolutions Nap of the air pump 60 better.

On the other hand, when the FC current Ifc is dropping, excess air readily becomes present in the FC stack 40, so even if the amount of air supplied to the FC stack 40 is reduced in accordance with the reduction in system load Psys, the FC current Ifc gradually drops until the excess air is consumed. As a result, the airflow and FC current Ifc may not track the decrease in system load Psys as well. That is to say, a situation like applying rate limiting control may occur when the FC current Ifc is dropping.

Accordingly, when the FC current Ifc is dropping, the predetermined value β may be set smaller than the predetermined value α, so that the target FC current Ifctgt (last time) is smaller than the target FC current Ifctgt (this time), thus alleviating the rate limiting control as to the airflow and FC current Ifc as compared with when the FC current Ifc is increasing. That is to say, when the FC current Ifc is decreasing, a situation like applying rate limiting control occurs when the FC current Ifc is dropping due to the above-described deterioration in tracking, so the predetermined value β does not have to be set to be greater than the predetermined value α.

Alternatively, since a situation like applying rate limiting control is occurring, β=0 may be set when the FC current Ifc is dropping, such that the target FC current Ifctgt (preceding time) from the preceding time is set for the target FC current Ifctgt (this time) for this time, in the same way as with step S63. That is to say, with this embodiment, rate limiting control is executed only at the time of the FC current Ifc rising, and rate limiting control does not have to be executed at the time of the FC current Ifc falling.

Executing Third Mode

The third mode is primarily used when the system load Psys is relatively low, with the target cell voltage Vcelltgt (which is target FC voltage Vfctgt/number-of-cells Nfc) fixed to a potential other than the redox advancing region R3 (with the present embodiment, potential v3, which is 0.9 V), and the FC current Ifc is made to be constant. Insufficient FC power Pfc is supplied by assistance from the battery 20, and excess FC power Pfc is charged to the battery 20. The target oxygen concentration Cotgt is fixed to the normal oxygen concentration Conml (or oxygen is maintained in a plentiful state).

That is to say, as illustrated in FIG. 10, with the third mode, the cell voltage Vcell is fixed to potential v3 in a state where the IV property of the FC stack 40 is the normal IV property (FC voltage Vfc is potential v3×number-of-cells Nfc). Accordingly, the ECU 24 sets the target oxygen concentration Cotgt to normal oxygen concentration Conml, and sets the revolutions Nap of the air pump 60, the revolutions Nwp of the water pump 80, the opening angle θbp of the back-pressure valve 64, and the opening angle θc of the circulation valve 66, according to this target oxygen concentration Cotgt. Further, the ECU 24 boosts the secondary voltage V2 with the DC/DC converter 22 such that the FC voltage Vfc is potential v3×number-of-cells Nfc, in order to fix the cell voltage Vcell to the potential v3.

According to the third mode such as described above, in the event that the system load Psys is a low load, the system load Psys can be handled by the FC power Pfc and battery power Pbat.

FC Generating Control

As described above, for FC generating control (S4 in FIG. 5), the ECU 24 controls the peripheral devices of the FC stack 40, which are the air pump 60, back-pressure valve 64, circulation valve 66, and water pump 80. Specifically, the ECU 24 controls these devices using command values (e.g., S35 in FIG. 14) for the devices calculated in energy management (S3 in FIG. 5).

Torque Control of Motor 14

Figure 26:
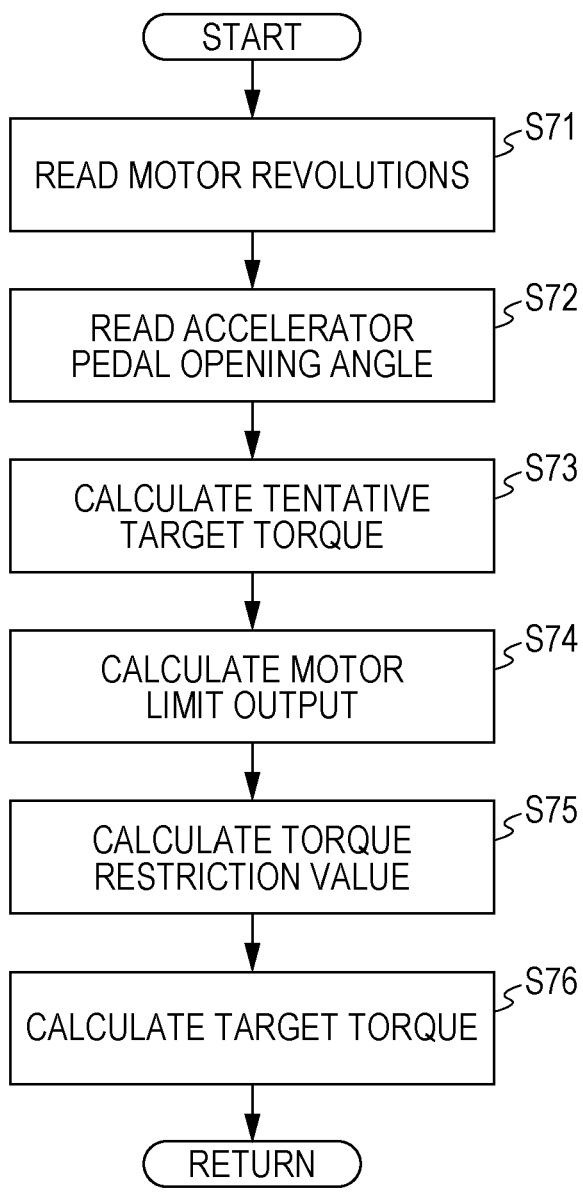
FIG. 26 is a flowchart for motor torque control.

FIG. 26 illustrates a flowchart for control of the torque of the motor 14. In step S71, the ECU 24 reads in the motor revolutions Nm from the RPM sensor 152.

In step S72, the ECU 24 reads in the opening angle θp of the accelerator pedal 154 from the opening angle sensor 150.

In step S73, the ECU 24 calculates a temporary target torque Ttgt_p of the motor 14, of which the unit is Newton per meter (N·m), based on the motor revolutions Nm and the opening angle θp. Specifically, a map correlating the revolutions Nm, the opening angle θp, and the temporary target torque Ttgt_p, is stored in a storage unit not illustrated in the drawings, and the temporary target torque Ttgt_p is calculated based on the revolutions Nm and opening angle θp.

In step S74, the ECU 24 calculates the limit output of the motor 14 (motor limit output Pm_lim) which is equal to the limit value of power (limit supply power Ps_lim) which the FC system 12 can supply to the motor 14, the unit of which is watts (W). Specifically, the limit supply power Ps_lim and motor limit output Pm_lim are obtained by subtracting the power consumption Pa of the auxiliary devices from the sum of the FC power Pfc from the FC stack 40 and the power which can be supplied from the battery 20 (limit output Pbat_lim), i.e., (Pm_lim=Ps_lim←Pfc+Pbat_lim−Pa).

In step S75, the ECU 24 calculates the torque limit value Tlim of the motor 14, of which the unit is Newton per meter (N·m). Specifically, the torque limit value Tlim is calculated by dividing the motor limit output Pm_lim by vehicular speed Vs (Tlim←Pm_lim/Vs).

On the other hand, in step S74, in the event of having determined that the motor 14 is performing regeneration, the ECU 24 calculates limit supply regeneration power Ps_reg-lim. This limit supply regeneration power Ps_reglim is obtained by subtracting the power consumption Pa of the auxiliary devices from the sum of the limit value of power chargeable in the battery 20 (limit charge Pbat_chglim) and the FC power Pfc from the FC stack 40 (Ps_reglim=Pbat_chglim+Pfc−Pa). In the event that regeneration is being performed, in step S75 the ECU 24 calculates the regeneration torque control limit value Treglim, of which the unit is Newton per meter (N·m). Specifically, the torque limit value Tlim is calculated by dividing the limit supply regeneration power Ps_reglim by vehicular speed Vs (Tlim←Ps_reglim/Vs).

In step S76, the ECU 24 calculates target torque Ttgt, of which the unit is Newton per meter (N·m). Specifically, the ECU 24 obtains the target torque Ttgt by applying the limit of torque limit value Tlim to the temporary target torque Ttgt_p. In the event that the temporary target torque Ttgt_p is the torque limit value Tlim or smaller (Ttgt_p≤Tlim) for example, the temporary target torque Ttgt_p is used as the target torque Ttgt without change (Ttgt←Ttgt_p). On the other hand, in the event that the temporary target torque Ttgt_p exceeds the torque limit value Tlim (Ttgt_p>Tlim), the torque limit value Tlim is used as the target torque Ttgt (Ttgt←Tlim). The calculated target torque Ttgt is then used to control the motor 14.

Specific Control Example

Figure 27:
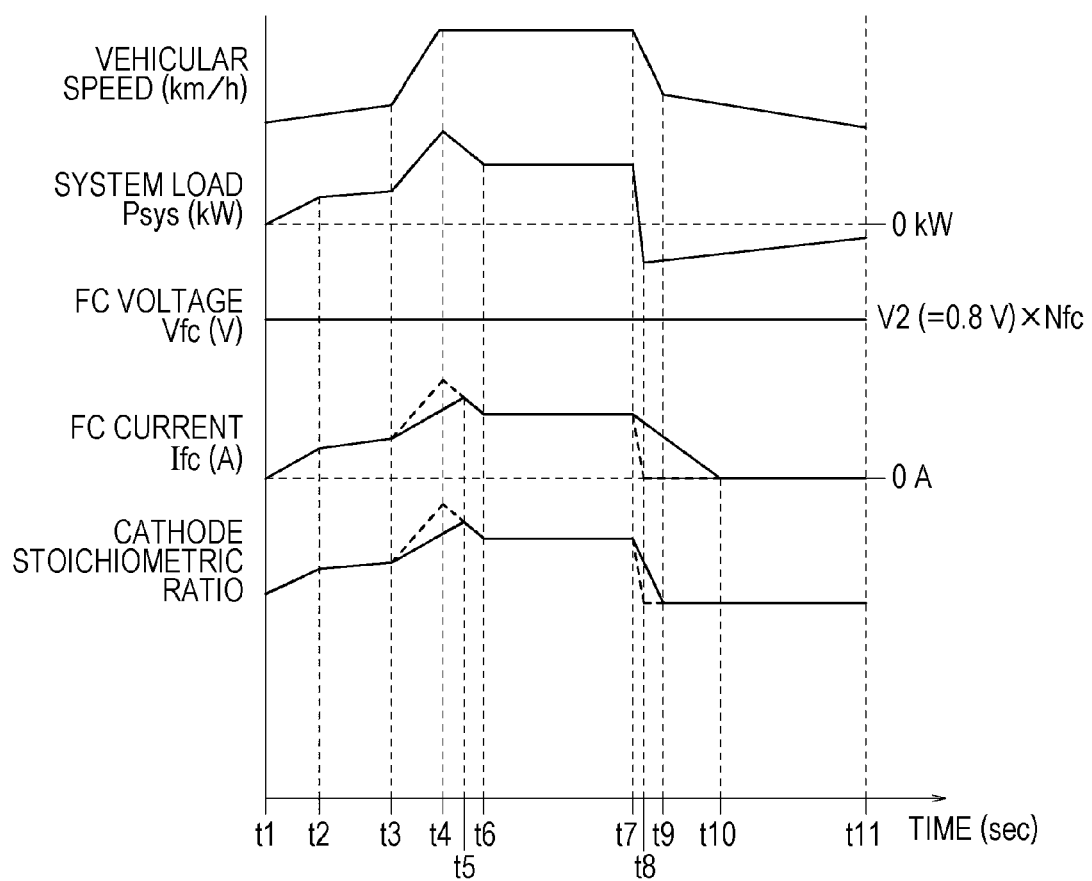
FIG. 27 is an example of a timing chart in a case of using the fixed voltage/variable output control and limited rate control according to the embodiment.

FIG. 27 is an example of a timing chart, illustrating a case of performing rate limiting control while executing the second mode. In FIG. 27, the portions of FC current Ifc and cathode stoichiometric ratio indicated by dotted lines are portions where rate limiting control is not performed.

In this case, in accordance with the user operating the accelerator pedal 154 of the FC vehicle 10, the vehicular speed gradually accelerates from point-in-time t1 to point-in-time t3, thereafter sharply accelerates from point-in-time t3 to point-in-time t4, maintains a constant speed from point-in-time t4 to point-in-time t7, and thereafter sharply decelerates from point-in-time t7 to point-in-time t9, and gradually decelerates from point-in-time t9 to point-in-time t11.

The system load Psys changes in accordance with change in the vehicular speed. That is to say, the system load Psys gradually increases from point-in-time t1 through point-in-time t2 to point-in-time t3, and quickly increases from point-in-time t3 to point-in-time t4. Also, during the time period from point-in-time t4 through point-in-time t7 at constant speed, the system load Psys decreases from point-in-time t4 through point-in-time t6 and maintains a constant value from point-in-time t6 to point-in-time t7. The system load Psys then rapidly decreases at deceleration from point-in-time t7 to point-in-time t8 and changes to the regeneration side, and changes toward 0 kW from point-in-time t8 to point-in-time t11.

In accordance with such change of the system load Psys, the FC system 12 changes the FC voltage Vfc, FC current Ifc, and cathode stoichiometric ratio, as described next. First, the second mode is being executed, so the FC voltage Vfc is maintained at a predetermined voltage value (Vfc=v2×Nfc) by the processing according to step S31 in FIG. 14. The cathode stoichiometric ratio and FC current Ifc are changed to track the change of the system load Psys, in accordance with the processing of FIGS. 14, 20, and 25. That is to say, the cathode stoichiometric ratio and FC current Ifc gradually increase from point-in-time t1 to point-in-time t3.

Also, during the time period from point-in-time t3 to point-in-time t4 where the system load Psys suddenly increases, the rate limiting control according to the processing of steps S34 and S35 in FIG. 14 and steps S64 and S65 in FIG. 25 is executed, whereby the cathode stoichiometric ratio gradually increases tracking the system load Psys, while being restricted to a value lower than the dotted line. As a result, the FC current Ifc gradually increases tracking the system load Psys while being restricted to a value lower than the dotted line. That is to say, the cathode stoichiometric ratio and FC current Ifc also increase tracking acceleration of the FC vehicle 10 due to the user having operated the accelerator pedal 154.

During the time period from point-in-time t4 to point-in-time t5, the cathode stoichiometric ratio and FC current Ifc increase despite the system load Psys decreasing. The reason is that, even though the system load Psys has decreased, there is excess air in the FC stack 40, and the FC current Ifc cannot be reduced tracking the system load Psys until this excess air is first consumed. Accordingly, during the time period of point-in-time t4 to point-in-time t5, the amount of air supplied from the cathode system 43 to the FC stack 40 is reduced, but the cathode stoichiometric ratio is increasing due to the excess air remaining in the FC stack 40 and air that is supplied thereto. Also, with the FC stack 40, both the excess air and air supplied from the cathode system 43 are consumed, so the FC current Ifc also rises. Thus, the cathode stoichiometric ratio and FC current Ifc can be raised during the time period from point-in-time t3 through point-in-time t5 by operating the air pump 60 so as to track the operations of the accelerator pedal 154.

Also, during the time period from point-in-time t3 through point-in-time t5, there is the need to supply air to the FC stack 40 tracking the sudden increase on system load Psys in accordance with operations of the accelerator pedal 154. On the other hand, rate limiting control is applied when the cathode stoichiometric ratio and FC current Ifc are rising, so there is the possibility that air supply to the FC stack 40 will become insufficient and power generating at the FC stack 40 will become unstable. In such a case, in order to secure stability of generating at least the minimum required electric power, the processing of steps S37 through S42 in FIG. 14 is executed to increase the amount of air supply, thereby enabling stability of generating electricity at the FC stack 40 in accordance with the generating state of the FC stack 40.

Figure 23:
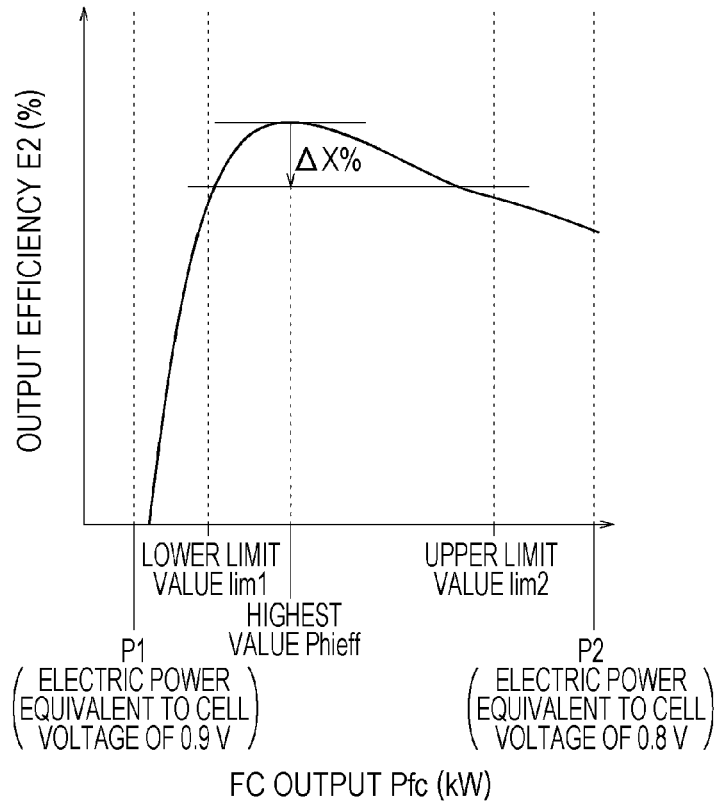
FIG. 23 is a diagram for describing a setting method for lower limit value and upper limit value used for FC output in the second mode.

Further, the net efficiency of generating electricity at the FC stack 40 can be improved by generating at the low output side near the highest value Phieff, as illustrated in FIG. 23. Also, performing control such that here is as little output from the FC stack 40 as possible while executing rate limiting control enables the generating efficiency Efc2 of the FC stack 40 to be improved.

In further detail, in the event of not performing the rate limiting control indicated by the dotted lines in FIG. 27, the FC current Ifc suddenly rises, so the FC power Pfc corresponding to the FC current Ifc also suddenly rises. Accordingly, the output efficiency E2 in a case of not performing the rate limiting control drops toward the P2 side in a short time from the highest value Phieff, due to the output efficiency E2 property in FIG. 23.

On the other hand, in the event of performing the rate limiting control, the FC current Ifc gradually rises, so the FC power Pfc corresponding to the FC current Ifc also gradually rises. Accordingly, the output efficiency E2 (net efficiency) in a case of performing rate limiting control gradually drops toward the P2 side from the highest value Phieff, due to the output efficiency E2 property in FIG. 23.

Once the excess air can be consumed by point-in-time t5, the cathode stoichiometric rate and FC current Ifc can be decreased in the time period from point-in-time t5 to point-in-time t6 tracking the reduction in system load Psys. In this case, due to the processing of steps S34 and S35 in FIG. 14 or the processing of steps S64 and S66 in FIG. 25, the rate limiting control is either alleviated or stopped. That is to say, when the FC current Ifc is decreasing, this creates a situation like rate limiting control being applied, so by alleviating or stopping the rate limiting control as to the cathode stoichiometric ratio and FC current Ifc in the time period from point-in-time t5 to point-in-time t6, the cathode stoichiometric ratio and FC current Ifc can be gradually reduced.

The system load Psys is a constant value from point-in-time t6 to point-in-time t7, so due to the processing of steps S34 and S35 in FIG. 14 or the processing of steps S62 and S63 in FIG. 25, the rate limiting control is temporarily cancelled, and only the second mode is executed. Accordingly, during this time period, the cathode stoichiometric ratio and FC current Ifc maintain a constant value, tracking the system load Psys.

In the time period from point-in-time t7 to point-in-time t8, the system load Psys rapidly drops. Allowing the cathode stoichiometric ratio and FC current Ifc to change in a manner tracking this rapid decrease, there is concern that the FC stack 40 may deteriorate. Also, there is excess air at the FC stack 40 when the system load Psys is dropping, so the FC current Ifc cannot be reduced unless this excess air is consumed.

Accordingly, in the time period from point-in-time t7 through point-in-time t10, restriction on the cathode stoichiometric ratio and FC current Ifc by the rate limiting control is either alleviated or stopped, in the same way as with the time period from point-in-time t5 to point-in-time t6. Accordingly, the absolute value in time-change rate of the cathode stoichiometric ratio and FC current Ifc is smaller as compared to the time period from point-in-time t3 through point-in-time t5 (when the cathode stoichiometric ratio and FC current Ifc are rising). As a result, the cathode stoichiometric ratio and FC current Ifc can be gradually reduced as compared to the dotted lines, while consuming excess air within the FC stack 40. In this case, after the cathode stoichiometric ratio drops to the predetermined value at point-in-time t9, at point-in-time t10 the FC current Ifc drops to approximately 0 A. Subsequently, the cathode stoichiometric ratio and FC current Ifc maintain approximately 0 A.

In the same way as with the time period from point-in-time t3 through point-in-time t5, generating electricity in the time period from point-in-time t7 through point-in-time t10 at the FC stack 40 at the low output side near the highest value Phieff in FIG. 23 enables the output efficiency E2 (net efficiency) to be improved, and also the generating efficiency Efc2 of the FC stack 40 to be improved. In this case, the FC power Pfc gently decreases along with the gentle decrease of the FC current Ifc, so the output efficiency E2 in a case of having performed rate limiting control gently rises toward the highest value Phieff near the highest value Phieff due to the property of the output efficiency E2 in FIG. 23. Accordingly, relatively high output efficiency E2 and generating efficiency Efc2 can be maintained in the time period from point-in-time t7 through point-in-time t10 as well, by performing rate limiting control.

Advantages of the Embodiment

As described above, according to the present embodiment, by executing the second mode (fixed voltage/variable current control), the airflow supplied to the FC stack 40 from the cathode system 43 can be changed so as to track the system load Psys, while maintaining the FC voltage Vfc to a voltage value outside the redox advancing voltage range (voltage value within reducing region R2 or oxidizing region R4). Accordingly, the output of the FC stack 40 (FC current Ifc and FC power Pfc) also changes in accordance with the airflow. AS a result, the FC voltage Vfc can be kept from transitioning to a redox advancing voltage range (increased platinum aggregation region R1, platinum redox advancing region R3, or carbon oxidizing region R5), thereby reducing oxidizing current and reducing current, and suppressing frequency of occurrence of oxidization reaction or reduction reaction of the catalyst (e.g., platinum) included in the cell. Accordingly, deterioration of the FC stack 40 can be suppressed while maintaining the capabilities of the catalyst.

Further, with the present embodiment, rate limiting control which restricts the time-change rate of airflow (the amount of fluctuation per time unit of air) is executed while executing the second mode. Restricting the amount of fluctuation per time unit of airflow by executing the rate limiting control also restricts the change rate of FC output (time-change rate of FC current Ifc and FC power Pfc). Consequently, oxidizing current and reducing current can be further reduced, and deterioration of the FC stack 40 can be further suppressed while changing the airflow while tracking the change of the system load Psys.

Thus, with the present embodiment, executing the above-described second mode and rate limiting control allows the oxidizing current and reducing current to be reduced more than with the case of Japanese Unexamined Patent Application Publication 2009-32418, and also the time-change rate of the output of the FC stack 40 (FC current Ifc and FC power Pfc) can be restricted. Accordingly, deterioration of the FC stack 40 can be suppressed.

As described above, with the second mode, the FC current Ifc is changed by changing the airflow in accordance with the system load Psys. In this case, the ECU 24 performed the following control as the fluctuation of the system load Psys.

In the case of increasing the FC current Ifc by increasing the airflow so as to track the increase in system load Psys, the time-increase rate of the airflow is restricted. Thus, the airflow and FC current Ifc can be increased so as to track the increase in system load Psys, while applying rate limiting control. On the other hand, in the case of reducing the FC current Ifc by reducing the airflow so as to track the reduction in system load Psys, restriction as to the time-decrease rate of the airflow is either alleviated or no restriction is performed as to the time-decrease rate.

When the FC current Ifc is decreasing, excess air readily occurs within the FC stack 40. In such a state, even if the air supply is reduced in accordance with reduction in the system load Psys, the FC current Ifc gradually decreases until the excess air is consumed. As a result, the tracking capabilities of the airflow and FC current Ifc as to the reduction in the system load Psys are lowered. That is to say, when reducing the FC current Ifc, a situation such as having applied rate limiting control occurs.

Accordingly, with the present embodiment, restriction of airflow as to time-reduction rate (rate limiting control) is alleviated or rate limiting control is stopped when reducing the FC current Ifc, thereby gradually reducing the FC current Ifc, whereby deterioration of the FC stack 40 can be suppressed. Also, reducing or stopping the air supplying operations of the air pump 60 in accordance with alleviating or stopping the rate limiting control suppresses noise occurring at the air pump 60, so the quality of the FC system 12 can be improved.

Also, in the event that electric power generating at the FC stack 40 is not stable, the ECU 24 controls the air pump 60, back-pressure valve 64, and circulation valve 66, such that the airflow increases. That is to say, performing rate limiting control when the FC current Ifc is rising may result in airflow supplied to the FC stack 40 from the air pump 60, back-pressure valve 64, and circulation valve 66 of the cathode system 43 being insufficient, and electric power generating at the FC stack 40 becoming unstable. Accordingly, increasing the air supply in accordance with the electric power generating state at the FC stack 40 allows stable electric power generating to be maintained at the FC stack 40.

Also, with the FC vehicle 10, change in the opening angle θp of the accelerator pedal 154 due to user operations of the accelerator pedal 154, and more particularly, change in the system load Psys according to the opening angle θp of the accelerator pedal 154, occurs frequently, so installing the FC system 12 in the FC vehicle 10 allows operations tracking the operations of the accelerator pedal 154, which indicate user requests, to be realized.

That is to say, when the FC current Ifc is to be increased in response to increased FC power Pfc in accordance with the opening angle θp of the accelerator pedal 154, the airflow supplied to the FC stack 40 from the cathode system 43 is increased, and on the other hand when the FC current Ifc is to be decreased in response to decreased FC power Pfc, the airflow supplied to the FC stack 40 from the cathode system 43 is decreased, capabilities regarding noise and vibrations while tracking the operations of the accelerator pedal 154 can be realized. Thus, performing rate limiting control while executing the second mode results in lower output of the FC stack 40, so the output efficiency E2 (net efficiency) of the FC unit 18 can be improved.

Modifications

Note that the above-described embodiment is not restrictive, and that various configurations may be made based on the descriptions of the present Specification. For example, the following configurations may be made.

While the FC system 12 was described in the above embodiment as being installed in a FC vehicle 10, this arrangement is not restrictive, and may be installed in other objects to which fixed voltage/variable current control (fixed voltage/variable output control) is applicable. For example, the FC system 12 may be used with traveling objects such as ships, airplanes, and the like. Also, the FC system 12 may be used with moving mechanisms such as robot arms, cranes, balancers, and the like. Further, the FC system 12 may be applied to home electric power systems.

Figure 28:
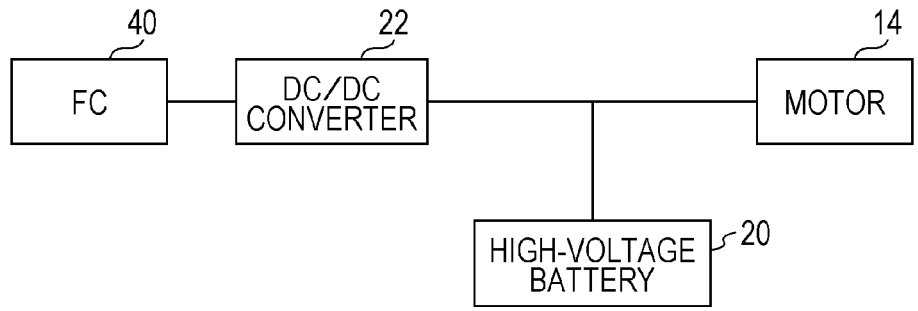
FIG. 28 is a block diagram illustrating a schematic configuration of a first modification of the fuel cell vehicle according to the embodiment.

Also, while an arrangement was described in the above embodiment as the FC stack 40 and battery 20 being arrayed in parallel, with the DC/DC converter 22 situated next to the battery 20, this configuration is not restrictive. For example, a configuration may be made such as illustrated in FIG. 28 for example, where the FC stack 40 and the battery 20 are arrayed in parallel, and a step-up, step-down, or step-up/step-down DC/DC converter 22 is disposed next to the FC stack 40.

Figure 29:
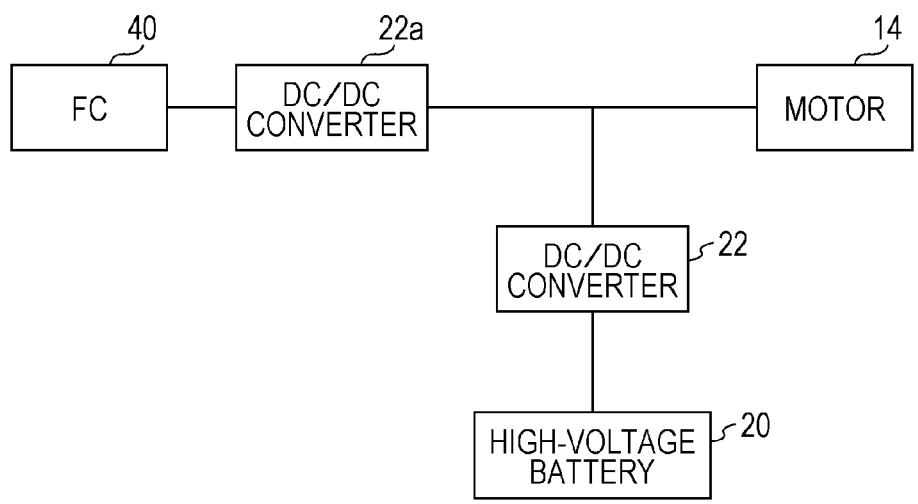
FIG. 29 is a block diagram illustrating a schematic configuration of a second modification of the fuel cell vehicle according to the embodiment.
Figure 30:
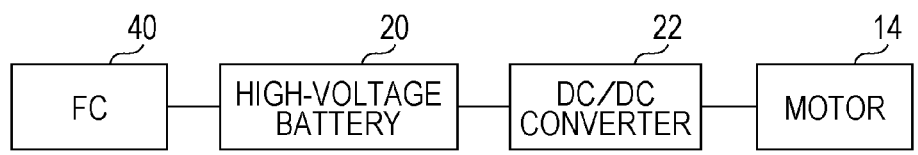
FIG. 30 is a block diagram illustrating a schematic configuration of a third modification of the fuel cell vehicle according to the embodiment.

Alternatively, a configuration may be made such as illustrated in FIG. 29 for example, where the FC stack 40 and the battery 20 are arrayed in parallel, and a step-up, step-down, or step-up/step-down DC/DC converter 22a is disposed next to the FC stack 40, and a DC/DC converter 22 is disposed next to the battery 20. Moreover, a configuration may be made such as illustrated in FIG. 30 for example, where the FC stack 40 and the battery 20 are arrayed serially, and a DC/DC converter 22 is disposed between the battery 20 and motor 14.

Also, while an arrangement was described in the above embodiment with the target oxygen concentration Cotgt being adjusted as a technique or method to adjust the stoichiometric ratio, this arrangement is not restrictive, and an arrangement may be made where the target hydrogen concentration is adjusted. Also, and an arrangement may be made where target flow is used instead of target concentration, or an arrangement may be made where both target concentration and target flow are used.

Also, while an arrangement was described in the above embodiment regarding rate limiting control of the cathode stoichiometric ratio and FC current Ifc in a case of supplying air to the FC stack 40 from the cathode system 43, rate limiting control of the anode stoichiometric ratio and FC current Ifc in a case of supplying hydrogen to the FC stack 40 from the anode system 41 may be performed instead or in addition to this, as a matter of course.

Also, while an arrangement was described in the above embodiment where the first through third modes are used as electric power supply modes, but the technology of the present disclosure is applicable as long as at least the second mode is used.

Also, while an arrangement was described in the above embodiment where the target FC voltage Vfctgt in the second mode is set to potential v2 (0.8 V)×number-of-cells Nfc, but this arrangement is not restrictive. For example, the target FC voltage Vfctgt in the second mode may be set to another potential (v3 (0.9 V)) within the reducing region R2 or oxidizing region R4.

Also, while an arrangement was described in the above embodiment where control of the oxygen concentration Co in the second mode is realized by making the circulation valve opening angle θc, air pump revolutions Nap, and back-pressure valve opening angle θbp, are variable, but arrangements are not restricted to this as long as the oxygen concentration Co can be controlled. For example, an arrangement may be made where the air pump revolutions Nap is constant and the circulation valve opening angle θc is variable. This makes the output sound of the air pump 60 to be constant, and accordingly a situation where the changing output sound is unpleasant to the passengers can be prevented.

Also, while an arrangement was described in the above embodiment where a lower limit value lim1 and upper limit value lim2 are used, an arrangement may be made where just one of the two is used.

Also, while an arrangement was described in the above embodiment where the highest-efficiency realization output Phieff is set to temporary target FC output Pfctgt_t in the event that the system load Psys is lower than the lower limit value lim1 or higher than the upper limit value lim2, but this may be a different value as long as a value within the highest-efficiency realizing region Rhieff. For example, in the event that the system load Psys is lower than the lower limit value lim1, the lower limit value lim1 may be set as the temporary target FC power Pfctgt_t. In the same way, in the event that the system load Psys exceeds the upper limit value lim2, the upper limit value lim2 may be used as the temporary target FC power Pfctgt_t.

Also, while an arrangement was described in the above embodiment where a regeneration average correction coefficient γ, an arrangement may be made where the coefficient γ is not used.

Also, an arrangement was described in the above embodiment where, in the third mode, the target cell voltage Vcelltgt is fixed to potential v3 (0.9 V) and the FC current Ifc is also fixed. In the third mode as well, the FC current Ifc may be made to be variable while performing rate limiting control at v3=0.9 V. Thus, unnecessary charging of the battery 20 can be suppressed, thereby improving overall efficiency of the FC system 12, and greatly suppressing deterioration of the FC stack 40 by rate limiting control.

Also, an arrangement was described in the above embodiment regarding the fixed voltage/variable current control (second mode) and fixed voltage/fixed current control (third mode) of the target FC voltage Vfctgt, so that the cell voltage Vcell does not transition to a redox advancing voltage range (the increased platinum aggregation region R1, platinum redox advancing region R3, or carbon oxidizing region R5, in FIG. 8). With the present embodiment, another example which is described below may be made where the amount of change of the FC voltage Vfc per time unit (time-change rate of FC voltage Vfc, time-change amount of FC voltage Vfc, response speed of FC voltage Vfc) is made to be less sensitive, so as to perform rate limiting control. With another example, either the above-described first mode (first control mode) is executed, or a second control mode including the above-described second mode or third mode is executed, and rate limiting control where the time-change amount of the FC voltage Vfc is made less sensitive is executed.

With the first control mode (control at normal ratio or higher), we will express the time-change rate of the FC voltage Vfc as ΔVfc, the time-change rate of the FC power Pfc as ΔPfc, and the revolutions Nap of the air pump 60 as ΔNap, and on the other hand with the second control mode, we will express the time-change rate of the FC voltage Vfc' as ΔVfc', the time-change rate of the FC power Pfc' as ΔPfc', and the revolutions Na'p of the air pump 60 as ΔNap'. In this case, the following Expressions (3) and (4) preferably hold between the first control mode and the second control mode.

$$|\Delta Pfc|/|\Delta Nap| > |\Delta Pfc'|/|\Delta Nap'| \quad (3)$$

$$|\Delta Vfc|/|\Delta Nap| > |\Delta Vfc'|/|\Delta Nap'| \quad (4)$$

Accordingly, in comparison with the first control mode, control is performed to make ΔVfc', which is the time-change rate of the FC voltage Vfc', and ΔPfc', which is the time-change rate of the FC power Pfc', to be less sensitive. Accordingly, both the second mode and third mode where fixed voltage control is performed (ΔVfc'=0) are included in the second control mode.

As can be understood from the above Expressions (3) and (4), this other example is an arrangement where control is performed under the conditions that ΔNap≠0 and ΔNap'≠0, so in the event that the revolutions Nap and Nap' of the air pump 60 are constant over time (ΔNap=ΔNap'=0) or operation of the air pump 60 is stopped (Nap=Nap'=0), neither the first control mode nor the second control mode is performed. That is to say, with this other example, control is performed where the revolutions Nap and Nap' of the air pump 60 track the change in system load Psys (FC power Pfc, Pfc') over time.

Thus, with the first control mode, control is performed such that the target FC voltage Vfctgt is fixed so as to not transition into a redox advancing voltage range, so deterioration of the FC stack 40 can be suppressed. On the other hand, with the second control mode, control where the time-change amount ΔVfc' is made less sensitive than with the first control mode (control where the response speed of the FC voltage Vfc' is lowered) is performed, so even if the FC voltage Vfc' transitions into a redox advancing voltage range, deterioration of the FC stack 40 can be suppressed. Accordingly, with this other example as well, durability of the FC stack 40 can be improved.

Now, the other example will be described in further detail with reference to the timing charts in FIGS. 31 and 32. In FIG. 31, during the time period of t21 through t24, the first control mode (normal stoichiometric region) is executed, and during the time period after t24, the second control mode (fixed voltage region) is executed. Note that in FIG. 31, the above-described second mode or third mode is executed in the second control mode. The dotted lines in FIG. 31 represent, as one example, power consumption Pmot and Pmot' of the motor 14 corresponding to v2=0.8 V (predicted electric power consumption Pm), FC power Pfc and Pfc' (target FC power Pfctgt), and FC voltage Vfc and Vfc'.

In FIG. 31, the power consumption Pmot maintains a constant value from point-in-time t21 to point-in-time t22, then increases from point-in-time t22 to point-in-time t23 at a time-change rate of ΔPmot, and maintains a constant value from point-in-time t23 to point-in-time t24. The power consumption Pmot' suddenly drops at point-in-time t24, then maintains a constant value from point-in-time t24 to point-in-time t25, increases from point-in-time t25 to point-in-time t26 at a time-change rate of ΔPmot' (ΔPmot'=ΔPmot), and maintains a constant value from point-in-time t26 to point-in-time t27.

In response to such change in the power consumption Pmot and Pmot', the FC system 12 changes the FC voltage Vfc and Vfc', FC power Pfc and Pfc', and revolutions Nap and Nap' of the air pump 60, as described next. The FC voltage Vfc maintains a constant value from point-in-time t21 to point-in-time t22, then decreases from point-in-time t22 to point-in-time t23 at a time-change rate of ΔVfc, and maintains a constant value from point-in-time t23 to point-in-time t24. The FC voltage Vfc' thereafter is fixed to a voltage value corresponding to v2−0.8 V at point-in-time t24, and maintains a constant value from point-in-time t24 through point-in-time t27 (ΔVfc'=0). In this case, |ΔVfc|>|ΔVfc'|, and accordingly, the change of the FC voltage Vfc' over time is less sensitive as compared to the first control mode.

Also, the FC power Pfc maintains a constant value from point-in-time t21 to point-in-time t22, then increases from point-in-time t22 to point-in-time t23, and maintains a constant value from point-in-time t23 to point-in-time t24. The FC power Pfc' suddenly drops to a value lower than output equivalent to v2=0.8 V at point-in-time t24, maintains a constant value from point-in-time t24 to point-in-time t25, and gradually increases from point-in-time t25 to point-in-time t27. Accordingly, FC power Pfc and Pfc' are obtained in accordance with the increase/reduction in power consumption Pmot and Pmot', so the power consumption Pmot and Pmot' can be handled with the FC power Pfc and Pfc'.

In FIG. 31, the revolutions Nap and Nap' of the air pump 60 change to track the increase/decrease of the power consumption Pmot and Pmot' and FC power Pfc and Pfc' (increase/decrease in system load Psys) in either of the first control mode and second control mode. As a result, the airflow supplied to the FC stack 40 changes in accordance with time-change of the revolutions Nap and Nap', whereby the airflow can be changed so as to track the increase/decrease in power consumption Pmot and Pmot' and FC power Pfc and Pfc'.

Specifically, revolutions Nap maintains a constant value from point-in-time t21 to point-in-time t22, and then increases from point-in-time t22 to point-in-time t23 at the time-change rate of ΔNap, and maintains a constant value from point-in-time t23 to point-in-time t24. Revolutions Nap' suddenly drops at point-in-time t24, then maintains a constant value from point-in-time t24 to point-in-time t25, and gradually increases from point-in-time t25 to point-in-time t27 at the time-change rate of ΔNap'.

In this case, |ΔNap|>|ΔNap'| during the time period of t22 to t23 and the time period of t25 through t27, and the change over time of the revolutions Nap' is less sensitive with the second control mode as compared to with the first control mode. Note that in either of the first control mode and second control mode, the airflow supplied to the FC stack 40 can be changed so as to track the increase/decrease in power consumption Pmot and Pmot' and FC power Pfc and Pfc', by changing the revolutions Nap and Nap' of the air pump 60 in accordance with increase/decrease in power consumption Pmot and Pmot' and FC power Pfc and Pfc'.

Now, if we set the ratio of the powers, voltages, and revolutions, such that, for example, ΔPmot=ΔPmot'=1, ΔVfc=−1, and ΔNap=1 and ΔNap'=0.3, the following relationships in Expressions (5) and (6) hold between the first control mode and second control mode.

$$|\Delta Vfc|:|Nap|=1:1 \quad (5)$$

$$|Vfc'|:|\Delta Nap'|=0:0.3 \quad (6)$$

In FIG. 31, the FC voltage Vfc and Vfc' do not exceed a voltage corresponding to v=0.8 V in either of the first control mode and second control mode, and accordingly do not transition to a redox advancing voltage range, so deterioration of the FC stack 40 can be suppressed and duration improved.

On the other hand, in FIG. 32, the first control mode as with the time period t21 through t24 in FIG. 31 is performed for the time period t31 through t34. Also, the power consumption Pmot and Pmot' and FC power Pfc and Pfc' change in the same way as with the case in FIG. 31.

In FIG. 32, the FC voltage Vfc' is set to a voltage value corresponding to v3=0.8 V at t34, and then gradually increases from point-in-time t34 through point-in-time t37. Accordingly, during the time period t34 through t37, the FC voltage Vfc' enters the platinum redox advancing region R3. However, with the case in FIG. 32 as well, the relationship of |ΔNap|>|ΔNap'| holds between the time-change rate ΔVfc' of the FC voltage Vfc' and the time-change rate ΔVfc, so in the second control mode, the change over time of the FC voltage Vfc' is less sensitive as compared with the first control mode.

The revolutions Nap' of the air pump 60 also maintain a constant value from point-in-time t34 to point-in-time t35, and gradually increase from point-in-time t35 through point-in-time t37, in the same way as with FIG. 31. In this case as well, the relationship of |ΔNap|>|ΔNap'| holds regarding the time-change rate ΔVfc' in the time period t35 through t37, and the change over time of the revolutions Nap' is less sensitive as compared with the first control mode.

Also, in FIG. 32 as well, the airflow supplied to the FC stack 40 can be made to change so as to track the increase/decrease in the power consumption Pmot' and FC power Pfc', by changing the revolutions Nap' of the air pump 60.

Now, with FIG. 32 as well, if we set the ratio of the powers, voltages, and revolutions, such that, for example, ΔPmot=ΔPmot'=1, ΔVfc=−1, ΔVfc=0.1, and ΔNap=1 and ΔNap'=0.4, the following relationships in Expressions (7) and (8) hold between the first control mode and second control mode.

$$|\Delta Vfc|:|Nap|=1:1 \quad (7)$$

$$|\Delta Vfc'|:|\Delta Nap'|=0.1:0.4 \quad (8)$$

In FIG. 32, the FC voltage Vfc and Vfc' do not exceed a voltage corresponding to v=0.8 V in either of the first control mode and second control mode, and accordingly do not transition to a redox advancing voltage range, so deterioration of the FC stack 40 can be suppressed and duration improved. On the other hand, with the second control mode, the FC voltage Vfc exceeds v2=0.8 and enters the redox advancing voltage range, but the time-change rate ΔVfc' of the FC voltage Vfc' is controlled so as to be less sensitive as compared with the first control mode, so deterioration of the FC stack 40 can be suppressed and duration improved.

A fuel cell system according to an embodiment includes: a fuel cell which has a catalyst, configured to generate electricity by effecting reaction of a reactant gas at the catalyst; a reactant gas supply device configured to supply the reactant gas to the fuel cell; a voltage adjusting unit configured to adjust output voltage of the fuel cell; a load driven by the output of the fuel cell; and a control device configured to control the reactant gas supply unit and the voltage adjusting unit.

The control device according to the embodiment executes the following control (1) and (2).

(1) Fixed voltage/variable output control is executed, where, in a state with the output voltage of the fuel cell being fixed to a voltage value outside of a redox advancing voltage range using the voltage adjusting unit, the supply amount of the reactant gas supplied from the reactant gas supply device to the fuel cell is changed so as to track request output of the load.

(2) In the event that there is change in the request output of the load while the fixed voltage/variable output control is being executed, the change rate of the supply amount of the reactant gas supplied from the reactant gas supply device to the fuel cell is restricted.

That is to say, by executing the fixed voltage/variable output control of (1), the supply amount of the reactant gas is changed so as to track request output of the load, while the output voltage of the fuel cell is maintained at a voltage value outside of a redox advancing voltage range. Accordingly, the output of the fuel cell (output current, output power) also changes in accordance with the supply mount of reactant gas. AS a result, by avoiding the output voltage of the fuel cell transitioning into the redox advancing voltage range, oxidizing current and reducing current is reduced, and the frequency of occurrence of oxidization reaction and reduction reaction at the catalyst (e.g., platinum) included in the cells of the fuel cell can be suppressed. Accordingly, deterioration of the fuel cell can be suppressed while maintaining the capabilities of the catalyst.

Further, the rate limiting control of (2), where the change rate of the supply amount of the reactant gas (variation of reactant gas volume over time) while the fixed voltage/variable output control is being executed, is restricted. Restricting the change rate of the supply amount of the reactant gas by performing rate limiting control also restricts the output of the fuel cell and the change rate (time-change rate of output current and output voltage) as well. As a result, oxidizing current and reducing current can be reduced even further, and deterioration of the fuel cell can be suppressed even further while changing the amount of reactant gas so as to track change in the request output of the load.

Thus, performing the above-described fixed voltage/variable output control and rate limiting control allows oxidizing current and reducing current to be reduced in comparison with Japanese Unexamined Patent Application Publication 2009-32418 which restricts the cell voltage change velocity, and change rate of the fuel cell (time-change rate of output current and output voltage) to be restricted. Thus, deterioration of the fuel cell can be suppressed.

As described above, with fixed voltage/variable output control, the supply amount of reactant gas to be changed in accordance with the request output of the load, so as to change the output current of the fuel cell. In this case, the control device according to the embodiment may perform the following control of (A) and (B) as to request output.

(A) In the event of increasing the output current of the fuel cell by increasing the supply amount of the reactant gas so as to track increase in the request output, the increase rate of the supply amount of the reactant gas may be restricted. Accordingly, the supply amount of the reactant gas and the output current can be increased so as to track increase in the request output, while applying rate limiting control.

(B) In the event of decreasing the output current of the fuel cell by decreasing the supply amount of the reactant gas so as to track decrease in the request output, restriction of the decrease rate of the supply amount of the reactant gas may either be alleviated, or no restriction of the decrease rate performed.

When the output current is dropping, excess reactant gas readily becomes present in the FC cell. In such a state, even if the amount of reactant gas is reduced in accordance with the reduction in request output, the output current gradually drops until the excess reactant gas is consumed. As a result, the airflow and output current may not track the decrease in request output as well. That is to say, a situation like applying rate limiting control may occur when the output current is dropping.

Accordingly, the decrease rate of the supply amount of the reactant gas (rate limiting control) is alleviated, or the rate limiting control is stopped, so as to let the output current gradually decrease, whereby deterioration of the fuel cell can be suppressed. Further, by reducing or stopping the supply of the reactant gas from the reactant gas supply device in accordance with the rate limiting control being alleviated or stopped, noise produced by the reactant gas supply device can be suppressed, thereby improving the product quality of the fuel battery system.

In the event that generating of electricity at the fuel cell is not stable, the control device controls the reactant gas supply device so that the supply amount of reactant gas increases. Performing rate limiting control when the output current of the fuel cell is increasing may incur a possibility that the airflow supplied to the fuel cell from the reactant gas supply device will be insufficient and generating electricity at the fuel cell will become unstable. Accordingly, to ensure stability of minimally needed electric power generation, the stability of generating at the fuel cell can be maintained by increasing the supply amount of the reactant gas in accordance with the generating state of the fuel cell.

The fuel cell system described above is preferably installed in a vehicle. With the vehicle, change in operation amount of the accelerator pedal due to user operations of the accelerator pedal (request load) frequently occurs. Accordingly, installing this fuel cell system in the vehicle can realize operations tracking accelerator pedal operations, which are user requests.

Further, instead of the above-described fixed voltage/variable output control and rate limiting control, the following control may be executed to realize suppressed deterioration of the fuel cell.

The control device according to the embodiment performs a first mode where output voltage of the fuel cell is set to a voltage value outside a redox advancing voltage range using the voltage adjusting unit, or a second control mode where output voltage of the fuel cell is set to a voltage value within the redox advancing voltage range or outside the redox advancing voltage range using the voltage adjusting unit. In this case, in the first control mode and the second control mode, the supply amount of reactant gas tracks increase and decrease of output of the fuel cell.

When comparing a first value obtained by subtracting an absolute value of change of the supply amount of reactant gas from an absolute value of change of the output voltage in the first control mode, per unit time, with a second value obtained by subtracting an absolute value of change of the supply amount of reactant gas from an absolute value of change of the output voltage in the second control mode, per unit time, the second value is smaller than the first value.

In this case, the first control mode is a control mode where control is effected such that output voltage of the fuel cell does not enter the redox advancing voltage range. On the other hand, the second control mode is a control mode where control is effected such that the time-change amount of the output voltage is decreased (so as to decrease the response speed of the output voltage).

Accordingly, with the second control mode, even in a case where the output voltage transitions into the redox advancing voltage range, control is effected such that the second value is made to be smaller than the first value, whereby deterioration of the fuel cell can be suppressed, and durability of the fuel cell can be improved. Moreover, with the second control mode, the supply amount of the reactant gas can be made to track the increase and decrease in output of the fuel cell, so deterioration of the fuel cell can be suppressed while the supply amount of reactant gas tracks the request output of the load.

According to the configurations described above, performing fixed voltage/variable output control and rate limiting control enables oxidizing current and reducing current to be reduced as compared with the Japanese Unexamined Patent Application Publication 2009-32418 which restricts the cell voltage change velocity, and change rate of the output of the fuel cell (output current and output power) can be restricted.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell system comprising:
    a fuel cell having a catalyst and configured to generate electricity by effecting reaction of a reactant gas at the catalyst;
    a reactant gas supply device to supply the reactant gas to the fuel cell;
    a voltage adjusting device configured to adjust an output voltage of the fuel cell;
    a load to be driven by an output of the fuel cell; and
    a control device configured to control the reactant gas supply device and the voltage adjusting device, the control device executing a fixed voltage/variable output control where, in a state where the output voltage of the fuel cell is fixed to a voltage value outside of a redox advancing voltage range using the voltage adjusting device, a supply amount of the reactant gas supplied from the reactant gas supply device to the fuel cell is changed so as to track an output requested by the load, the control device restricting a time change rate of the supply amount of the reactant gas supplied from the reactant gas supply device to the fuel cell so as to restrict a time change rate of the output of the fuel cell if there is change in the output requested by the load while the fixed voltage/variable output control is being executed, wherein, with the fixed voltage/variable output control, an output current of the fuel cell is changed by changing the supply amount of the reactant gas, wherein, in the fixed voltage/variable output control, when the output current of the fuel cell is increased by increasing the supply amount of the reactant gas so as to track increase in the requested output, an increase rate of the supply amount of the reactant gas is restricted, and wherein, in the fixed voltage/variable output control, when the output current of the fuel cell is decreased, a decrease rate of the supply amount of the reactant gas is restricted.

2. The fuel cell system according to claim 1, wherein, if generating of electricity at the fuel cell is not stable, the control device controls the reactant gas supply device so that the supply amount of reactant gas increases.

3. The fuel cell system according to claim 1, wherein the fuel cell system comprises a system installed in a vehicle.

4. The fuel cell system according to claim 1, wherein the control device executes the fixed voltage/variable output control by determining whether the output requested by the load is equal to or greater than a first threshold value and the request output of the load is smaller than a second threshold value, the fuel cell system being operable to provide the output current when the output requested by the load is smaller than the first threshold value.

5. The fuel cell system according to claim 1, wherein the control device is configured to execute the fixed voltage/variable output control by determining:

whether the output requested by the load is equal to or greater than a first threshold value and the requested output of the load is smaller than a second threshold value, whether a vehicular speed is smaller than a speed threshold value, or whether a vehicular acceleration is smaller than an acceleration threshold value.

6. The fuel cell system according to claim 5, wherein the control devices executes a variable voltage/variable output control when the output requested by the load is smaller than the first threshold value.

7. The fuel cell system according to claim 5, wherein the control device executes a fixed voltage/fixed output control when the output requested by the load is equal to or greater than the second threshold value.

* * * * *